United States Patent [19]

Ohmori

[11] Patent Number: 5,502,704
[45] Date of Patent: Mar. 26, 1996

[54] DISC RECORDING AND/OR REPRODUCING APPARATUS

[75] Inventor: Kiyoshi Ohmori, Kanagawa, Japan

[73] Assignee: Sony Corporation, Tokyo, Japan

[21] Appl. No.: 856,723

[22] Filed: Mar. 24, 1992

[30] Foreign Application Priority Data

Mar. 29, 1991  [JP]  Japan .................... 3-091552
Oct. 15, 1991  [JP]  Japan .................... 3-293831

[51] Int. Cl.⁶ .................... G11B 33/02; G11B 5/016
[52] U.S. Cl. .................... 369/77.2; 360/99.02
[58] Field of Search .................... 369/77.2, 75.1, 369/75.2; 360/99.02, 99.06

[56] References Cited

U.S. PATENT DOCUMENTS

| | | | |
|---|---|---|---|
| 4,627,037 | 12/1986 | Tamaru et al. | 369/270 |
| 4,644,521 | 2/1987 | Davis et al. | 369/77.2 |
| 4,682,322 | 7/1987 | Ohta | 369/77.2 |
| 4,794,481 | 12/1988 | Suyama et al. | 369/77.2 |
| 4,802,041 | 1/1989 | Uehara | 369/77.2 |
| 5,063,554 | 11/1991 | Uehara | 369/77.2 |
| 5,164,935 | 11/1992 | Shimegi et al. | 369/77.2 |

FOREIGN PATENT DOCUMENTS

| | | |
|---|---|---|
| 0205074A3 | 12/1986 | European Pat. Off. . |
| 0391465A1 | 10/1990 | European Pat. Off. . |
| 3606600A1 | 9/1986 | Germany . |

OTHER PUBLICATIONS

Patent Abstracts of Japan, vol. 12, No. 210 (P–717), 16 Jun. 1988 & JP A 63 009 072 (Matsushita), 14 Jan. 1988.
Patent Abstracts of Japan, vol. 13, No. 212 (P–873), 18 May 1989 & JP A 01 030 068 (Hitachi), 31 Jan. 1989.

*Primary Examiner*—Stuart S. Levy
*Assistant Examiner*—Allen Cao
*Attorney, Agent, or Firm*—Limbach & Limbach; Philip M. Shaw, Jr.

[57] ABSTRACT

Proposed is a disc recording and/or reproducing apparatus into which, of an optical disc cartridge having a cartridge main body housing an optical disc, which cartridge main body includes at least a guide section on at least one of its lateral sides along the direction of insertion into the apparatus, and a magnetic disc cartridge housing a magnetic disc of the same radius as the optical disc and having a thickness lesser than the thickness of the optical disc cartridge, only the optical disc cartridge may be loaded. The apparatus includes a loading unit for loading the optical disc cartridge onto a disc loading section, and a mistaken insertion inhibiting unit having a width broader than the thickness of the guide section of the optical disc cartridge and narrower than the thickness of the magnetic disc cartridge. The magnetic disc cartridge thinner than the optical disc cartridge may be prevented by the mistaken insertion inhibiting unit from being introduced into the main body of the disc recording and/or reproducing apparatus.

3 Claims, 22 Drawing Sheets

DISC RECORDING AND/OR REPRODUCING APPARATUS

BACKGROUND OF THE INVENTION

1. Field of the Invention

This invention relates to a disc recording and/or reproducing apparatus employed for an optical recording medium adapted for recording and/or reproducing information signals by a light beam, such as an optical disc or a magneto-optical disc. More particularly, it relates to such apparatus provided with a mistaken insertion inhibiting mechanism for permitting loading of only a disc cartridge housing such optical disc or magneto-optical disc and inhibiting loading of a disc cartridge housing other types of discs.

2. Description of Related Art

Among optical discs employing a light beam for recording and/or reproducing information signals, there are an optical disc used for only reproduction of information signals, and a magneto-optical disc adapted for erasing recorded signals for re-recording other information signals.

The optical disc is provided with a reflection layer formed of a metal thin film, such as aluminum, which reflection layer is applied as a thin film on a disc substrate having a pattern of recesses and lands formed after information signals by e.g. injection molding. Information signals recorded on the optical disc as a pattern of pits and grooves on the optical disc are read from the disc by radiating a beam of coherent light, such as a laser beam, and detecting changes in intensity of the reflected light beam due to interference produced when the light beam is reflected by the reflection layer for discriminating the pattern of the pits and grooves.

The magneto-optical disc has a signal recording layer formed by a perpendicular recording thin magnetic film formed on a light-transmitting disc substrate. This signal recording layer is heated to a temperature higher than the Curie temperature by radiation of a laser beam, while having its direction of magnetization inverted by the application of an external magnetic field to effect writing of information signals. The information signals written on the signal recording layer are read by radiating a plane polarized light flux, such as a laser beam, on the signal recording layer and by detecting changes in the direction of light polarization due to the Kerr effect on reflection of the light flux by the signal recording layer for discerning the changes in the direction of magnetization.

For writing and/or reading information signals on or from the optical disc, a disc recording and/or reproducing apparatus, constituted by an optical pickup device adapted for radiating the light beam to the disc and a magnetic head device for applying the external magnetic field. The optical pickup device is arranged for facing a major surface of the optical disc, that is a disc substrate, and adapted for radiating the converged light to the disc and detecting the laser light reflected from the disc. On the other hand, the magnetic head device is arranged on the opposite side of the optical pickup device, with the disc in-between, for facing the signal recording layer of the optical disc, and is adapted for applying the magnetic field to the signal recording layer of the optical disc.

With the present disc recording and/or reproducing apparatus, the optical disc is held and rotated by a rotational driving device for the optical disc, while the optical pickup device and the magnetic head device are moved radially of the disc for writing and/or reading the information signals on or from the recording region of the optical disc.

As an optical disc and a magneto-optical disc, employed as a recording medium for this type of the disc recording and/or reproducing apparatus, a disc having a diameter of approximately 3.5 inches is proposed. These discs, that is the optical disc and the magneto-optical disc, are constituted as a disc cartridge by being housed in a cartridge main body for preventing pollution due to deposition of dust and dirt and contact of hand or finger while the disc is not in use. A disc cartridge 201, such as shown in FIG. 1, is proposed as a disc cartridge housing a disc 202, such as the optical disc or the magneto-optical disc.

The optical disc cartridge 201, shown in FIG. 1, is constituted by a cartridge main body 203, and a shutter member 211 movably mounted on the cartridge main body 203.

Meanwhile, a chucking hub 202a is mounted at a mid part of one of the major surfaces of the disc 202 housed within the disc cartridge 201 for chucking the disc with respect to the disc rotating driving unit provided within the disc recording and/or reproducing apparatus in which the optical disc cartridge 201 is loaded.

The cartridge main body 203 housing the optical disc 202 is formed as a rectangle of a size large enough to accommodate the disc 202 which is 3.5 inches in diameter. The side of the major surface of the rectangle mounting the shutter member 211 is 90 mm long, with the other side of the major surface of the rectangle normal thereto being 94 mm. The cartridge main body 203 has a thickness of 6 mm. The cartridge main body 203 is made up of an upper cartridge half 205 and a lower cartridge half 204 which are abutted and secured to each other by set screws, ultrasonic welding or with the aid of an adhesive.

The lower half 204 of the cartridge main body 203 has a first aperture 206 for laying a chucking hub 202a of the optical disc 202 and a part of the signal recording region of the disc 202 to outside across the inner and outer peripheries of the disc. The first aperture 206 is formed as an elongated opening extending from a front side 209 toward the center of the cartridge main body 203.

When the optical disc cartridge 201 is loaded in the disc recording and/or reproducing apparatus, the first aperture 206 causes the chucking hub 202a to face a disk table of the disc rotating driving unit adapted for rotating the optical disc 202, while causing the signal recording section of the optical disc 202 to face the optical pickup device radiating an optical beam to the signal recording section.

The upper half 205 is provided with a second aperture, not shown, at a position in register with the first aperture 206 of the lower half 204. This second aperture, provided in proximity to the front side 209 of the cartridge main body 203, is a rectangular opening having a size to lay a part of the other major surface of the optical disc 202 to outside across the inner and outer peripheries of the disc. When the disc cartridge 201 is loaded in position in the disc recording and/or reproducing apparatus, the second aperture causes the other major surface of the optical disc 202 to face the magnetic head apparatus.

Meanwhile, at opening ends of the first aperture 206 and the second aperture on the front side 209 of the cartridge main body 203, the part of the cartridge main body directed towards the front side 209 is recessed at 206a, 210a to permit facilitated entrance of the magnetic head device and the optical pickup device in close facing relation with respect to the major surfaces of the optical disc 202. That is, the mid part of the cartridge main body 203 in proximity to the front side 209 is reduced in thickness in an area thereof in register with the first aperture 206 and the second aperture.

The shutter member 211 for opening or closing the first, aperture 206 and the second aperture is movably mounted on the cartridge main body 203. The shutter member 211 has a substantially U-shaped cross-section and is made up of a first plate section 212 adapted for closing the first, aperture 206 of the lower half 204, a second plate section 213 extending parallel to the first, section 212 and adapted for closing the second aperture, and a connecting web 214 interconnecting the proximal sides of the plate sections 212, 213.

The first plate section 212 is in the form of an elongated rectangle of a narrow width and of a size large enough to close the first aperture 206 of the lower half 204. The distal side of the first plate section 212 is pressed by a shutter pressor plate 215 mounted on the outer lateral side of the lower half 204 to prevent the first plate section 212 from being floated from the cartridge main body 203. On the proximal side of the first plate section 212, connected to the web 214, a first engaging pawl 217 adapted for being engaged with a first slide guide groove 216 provided on the outer lateral side of the lower half 204 is bent towards the second plate section 213. The second plate section 213 is in the form of a rectangle which is of a size large enough to close the second aperture provided in the upper half 203.

A shutter member guide arm section 218 is provided by extending the first and second plate sections 212, 213 from a lateral side of the web 214 in the direction of movement of the shutter member 211. This shutter member guide arm section 218 is provided between the recesses 206a, 210a formed on the front side 209 of the cartridge main body 203 and is of a width equal to that of the recesses 206a or 210a. When the shutter member 211 is moved to a position of opening the first aperture 206 and the second aperture, the guide arm section is located in register with the recesses 206a, 210a for exposing these recesses.

A U-shaped fitting clamping section 219 is provided at an end of the guide arm section 218 for clamping and fitting the front side 209 of the cartridge main body 203. The distal end of a tongue of the fitting holding section 219 extended over the lower half 205 is formed with a bent engaging pawl 221 adapted for being engaged with a second guide groove 220 formed on the outer lateral side of the lower half 204 for extending parallel to the first guide groove 216.

The shutter member 211 is fitted to the cartridge main body 203, with the fitting holding section 219 clamping the front side 209 of the cartridge main body 203 and with the first and second engaging pawls being engaged in the first and second guide grooves 216, 220, so that the shutter member may be moved in stability in a manner free from the risk of accidental extrication from the cartridge main body 203.

A spring retainer 222, adapted for retaining an end of a torsion coil spring, not shown, provided in the cartridge main body 203, is provided in a part of the connecting web 214. This torsion coil spring is adapted for perpetually biasing the shutter member 211 in a direction of closing the first aperture 206 and the second aperture of the lower half 205. The spring retainer 222 is bent substantially parallel to the first and second plate sections 212, 213 towards the inner side of the cartridge main body 203 so that the one end of the torsion coil spring is retained by the distal end of the spring retainer 222. Meanwhile, the other end of the torsion coil spring is retained by the forward corner of the cartridge main body 203.

The above described shutter member 211 may be moved between the position of closing the first aperture 206 and the second aperture and a position of opening these apertures, as indicated by an arrow C in FIG. 1.

The front side 209 of the cartridge main body 203 is formed with a notch 224 adapted for being engaged by shutter opening means, such as a shutter opening pin, of the disc recording and/or reproducing apparatus, for maintaining the first and second apertures in the opened state when the shutter member 211 is moved by the Shutter opening means. The notch 224 is formed as a groove at a position faced by the lateral side of the fitting holding section 219 of the Shutter member 211 when the first and the second apertures have been opened.

On lateral sides 207, 208 of the cartridge main body 203, guide flanges 201c, 201d, 201e and 201f are provided for extending from the front side 209 towards the rear side of the cartridge main body 203 in a direct, ion parallel to the inserting direction of the optical disc cartridge 201 into the disc recording and/or reproducing apparatus. These guide flanges 201c to 201f are flush with the upper and lower major surfaces of the cartridge main body 203. That is, these guide flanges are approximately 94 mm long and 1 mm in width, as indicated by arrows t1 and t3, and are projected from the cartridge main body 203 by a distance of 0.5 mm. Guide grooves 201a, 201b are defined by the guide flanges 201c, 201d and by guide flanges 201e, 201f, respectively. The distance between the guide flanges 201c, 201d and that between the guide flanges 201e, 201f, that is the width t2 of each of the guide grooves 201a, 201b is 4 mm. Meanwhile, the cartridge main body 203 has a width along the direction of movement of the shutter member 211, inclusive of the guide flanges, is 90 mm.

The lower half 204 is provided with a pair of engaging holes 225, 226 engaged by positioning pins, not shown, adapted for setting the horizontal loading position of the disc cartridge 201 when the disc cartridge is loaded in position in the disc recording and/or reproducing apparatus. A mistaken recording inhibiting member 227, adapted for indicating if information signals may be written on the optical disc 202, is provided on the lower half 204 in proximity to the engaging hole 226. An engaging notch 228, adapted for being engaged by an entraining pin provided in a loading mechanism of the disc recording and/or reproducing apparatus, is provided towards the front of the lateral side 207 of the cartridge main body 203.

Meanwhile, a magnetic disc is used widely as a recording medium for information signals. This magnetic disc is made up of a film-shaped base member coated with a magnetic medium. Since the magnetic disc is extremely fragile, it is constituted as a magnetic disc cartridge by being housed in a tough cartridge main body to assure protection and handling ease. A typical magnetic disc cartridge is disclosed in U.S. Pat. No. 4,918,559.

Similarly to the above described optical disc cartridge, the magnetic disc cartridge houses a magnetic disc which is 3.5 inches in diameter.

The magnetic disc cartridge 301 is hereinafter explained by referring to FIG. 2.

Similarly to the optical disc 202, accommodated in the optical disc cartridge 201, the magnetic disc cartridge 301 is provided with a cartridge main body 303 of a size large enough to accommodate a magnetic disc 302 having a diameter of 3.5 inches. Since the cartridge main body 303 is of the size large enough to accommodate the magnetic disc 302 which, similarly to the optical disc 202, is 3.5 inches in diameter, the cartridge main body 303 is similar in plan shape and size to the cartridge main body 203 constituting the optical disc cartridge 201. However, since the magnetic disc 302 is thinner than the optical disc 202, the cartridge main body 303 housing the magnetic disc 303 is thinner in thickness than the cartridge main body housing the optical disc 202. The cartridge main body 303 has a thickness T equal to 3 mm.

Meanwhile, the cartridge main body 303 is similarly provided with a recording/reproduction aperture 310 for laying the signal recording surface of the magnetic disc 302 to outside across the inner and outer peripheries of the disc and a shutter member 311 is movably mounted for opening or closing the aperture 310. This shutter member 311 is provided with a plate section 313 formed with an aperture 318 for laying the recording/playback aperture 310 to outside. This shutter member 311 is moved relative to the cartridge main body 303 so that, when the aperture 318 formed in the plate section 313 is moved as far as a position of facing the recording/playback aperture 310, the aperture 310 is opened and when the aperture 318 is moved as afar as a position of not facing the recording/playback aperture 310, the aperture 310 is closed.

Thus the optical disc cartridge 201, housing the optical disc 202 3.5 inches in diameter, and the magnetic disc cartridge 301, housing the magnetic disc 302, similarly 3.5 inches in diameter, are similar as far as the plan shape and the plan size, except the thickness, of the cartridge main body 203 and the cartridge main body 303, are concerned.

Meanwhile, such a disc recording and/or reproducing apparatus is proposed, in which a cartridge load/unload opening is provided in the main body of the apparatus, and the optical disc cartridge 201 is adapted to be introduced into and detached from the main body of the apparatus by means of the load/unload opening. The optical disc cartridge 201, inserted into and removed out of the apparatus via this load/unload opening, is loaded onto and unloaded from a cartridge loading section within the main body of the apparatus by means of a loading unit provided in the main body of the apparatus.

The cartridge load/unload opening is of a size large enough to introduce the optical disc cartridge 201 therethrough, that is, of a width approximately equal to the width of the side of the disc cartridge 201 provided with the shutter member 201, and a height approximately equal to the thickness of the optical disc cartridge 201. Consequently, not only the optical disc cartridge 201, but also the magnetic disc cartridge 301, which is of the same plan size as that of the disc cartridge 201 except the thickness, may be introduced via this cartridge load/unload opening.

With the above described disc recording and/or reproducing apparatus, employing the disc cartridge 201, the loading unit is activated even when the magnetic disc cartridge 301 is introduced. Since the loading unit is designed for loading the optical disc cartridge 201 thicker than the magnetic disc cartridge 301, if the magnetic disc cartridge 301 is introduced through error, it is caught by loading unit components or components of the guide unit, so that the magnetic disc cartridge can not be taken out of the disc recording and/or reproducing apparatus, or both the loading unit and the magnetic disc cartridge may be damaged. Besides, there is a risk that the magnetic disc 302 within the magnetic disc cartridge 301 or recording and/or reproducing means for information signals, such as magnetic head device or the optical pickup device provided in the main body of the apparatus, may also be damaged.

OBJECTS AND SUMMARY OF THE INVENTION

It is an object of the present invention to provide a disc recording and/or reproducing apparatus whereby only an optical disc cartridge may be loaded and loading of other types of the disc cartridges, such as a magnetic disc cartridge, may be inhibited positively.

It is another object of the present invention to provide a disc recording and/or reproducing apparatus whereby an optical disc cartridge guide unit, such as a loading unit, or recording and/or reproducing means for information signals, such as the optical pickup or magnetic head, may be protected effectively.

In accordance with the present invention, there is provided a disc recording or reproducing apparatus which incorporates means for allowing only the loading into the disc recording or reproducing apparatus of an optical disc cartridge having a cartridge main body housing an optical disc therein, the cartridge main body including at least a guide section on at least one lateral side edge thereof parallel to a direction of insertion of the optical disc cartridge into the disc recording or reproducing apparatus, and preventing the loading into the disc recording or playback apparatus of a magnetic disc cartridge housing a magnetic disc of the same radius as the optical disc therein and having a cartridge thickness lesser than the thickness of the optical disc cartridge and no guide section on a lateral side edge of the magnetic disc cartridge, comprising loading means having a cartridge insertion opening for loading the optical disc cartridge onto a disc loading section, and mistaken insertion inhibiting means having one or more protuberances for restricting a dimension of the cartridge insertion opening to be smaller than a corresponding dimension of a magnetic disc cartridge so as to block insertion of the magnetic disc cartridge into the cartridge insertion opening but for mating with the guide section of the optical disc cartridge so as not to prevent insertion of the optical disc cartridge into the cartridge insertion opening.

Other objects and advantages of the present invention will become apparent from the following description.

DETAILED DESCRIPTION OF THE PREFERRED EMBODIMENTS

Figure 1:
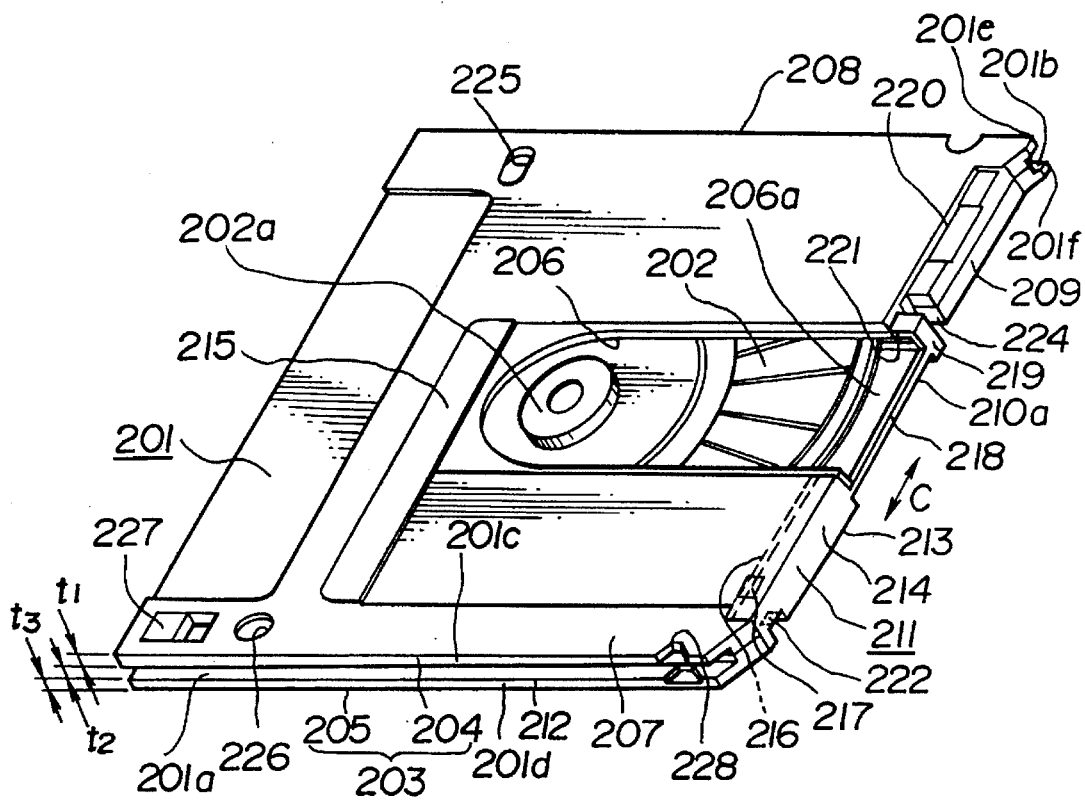
FIG. 1 is a perspective view showing the construction of an optical disc cartridge loaded on a disc recording and/or reproducing apparatus according to the present invention.
Figure 2:
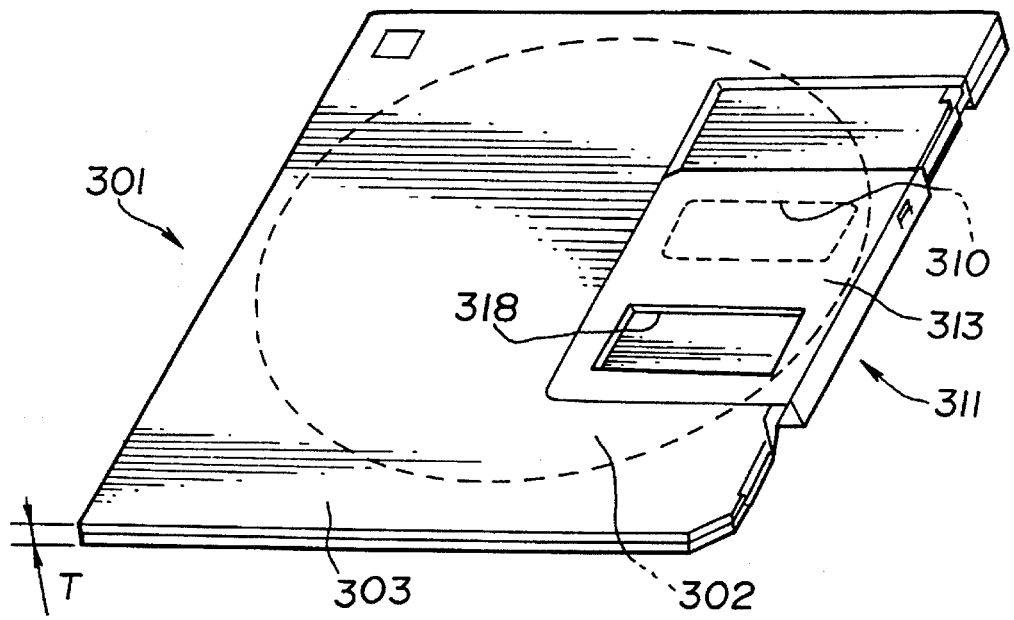
FIG. 2 is a perspective view showing the construction of a magnetic disc cartridge that can not be loaded in the present apparatus.

A disc recording and/or reproducing apparatus according to the present invention is provided with units and means for loading an optical disc cartridge 201 and recording and/or reproducing information signals on or from an optical disc 202 accommodated within the optical disc cartridge 201. That is, the disc recording and/or reproducing apparatus is provided with a disc loading unit 3 for loading the optical disc cartridge 201 on a cartridge loading section 1 and loading the optical disc 202 on a disc table of a disc rotating driving unit 2, an optical pickup device 4 radially moved across the inner and outer peripheries of the optical disc 202 rotationally driven by the disc table for recording and/or reproducing information signals on or from the optical disc 202, and a magnetic head device 5 for applying an external magnetic field during recording of information signals on the optical disc 202 while an optical beam is radiated by the optical pickup 4 to the optical disc 202.

Figure 3:
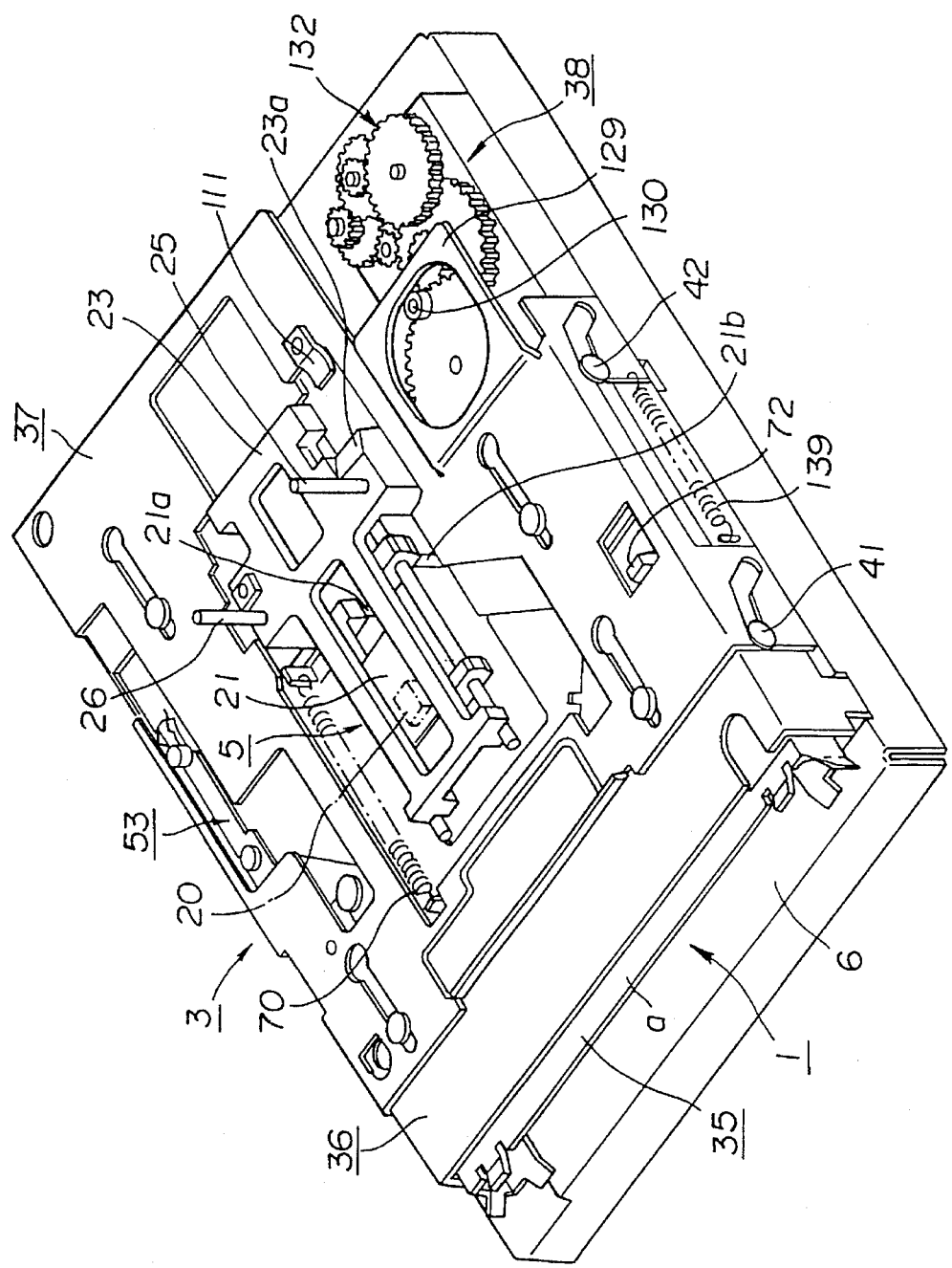
FIG. 3 is a perspective view showing the construction of a disc recording and/or reproducing apparatus according to the present invention.
Figure 4:
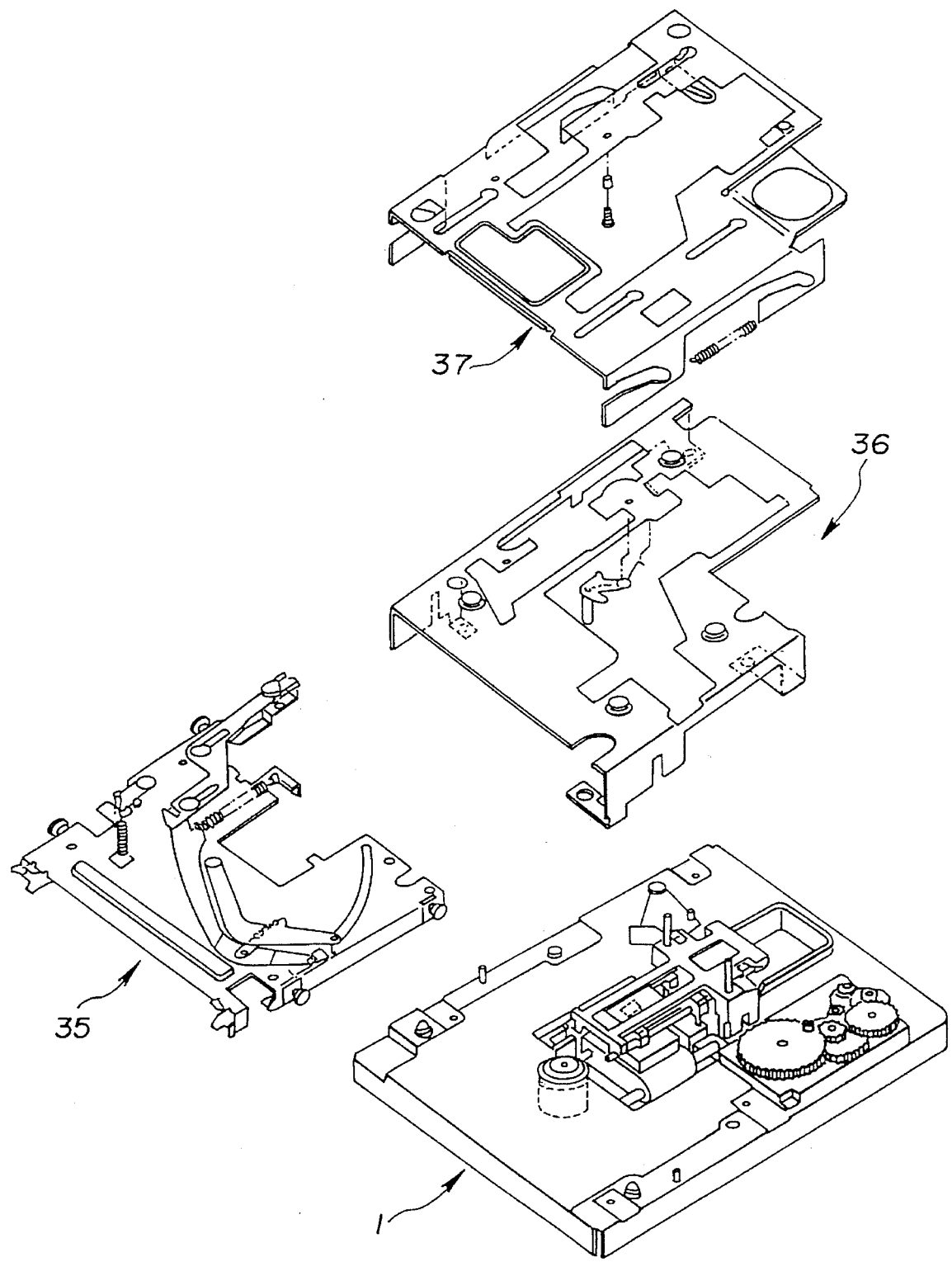
FIG. 4 is an exploded perspective view showing an essential part of the disc recording and/or reproducing apparatus shown in FIG. 3.
Figure 5:
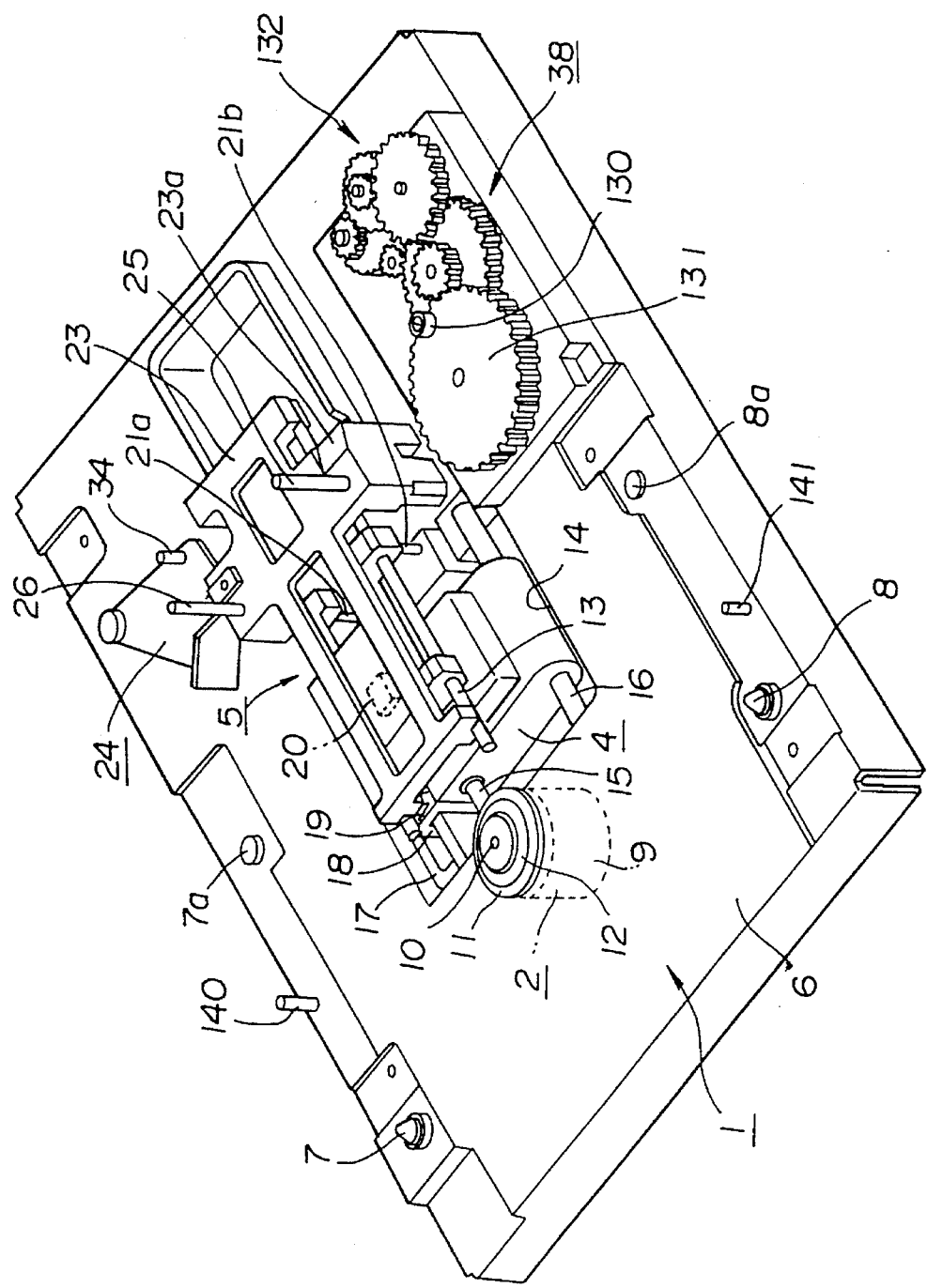
FIG. 5 is a perspective view showing the construction of a cartridge loading section of the disc recording and/or reproducing apparatus shown in FIG. 3.

Referring to FIGS. 3 to 5, the cartridge loading section 1 is provided with a chassis base plate 6 mounting the disc rotating driving unit 2 and the optical pickup 4. The optical disc cartridge 201 is loaded on an upper side of the chassis base plate 6 of the cartridge loading section 1. Positioning pins 7, 8 adapted to be engaged in engaging holes 225, 226 provided in the optical disc cartridge 201 are provided on the cartridge loading section 1, The optical disc cartridge 201 is loaded in position on the cartridge loading section 1 with the positioning pins 7, 8 being engaged in the engaging holes 225, 226. The cartridge loading section 1 is also provided with height position reference pins 7a, 8a adapted for being abutted on the optical disc cartridge 201 for maintaining the optical disc cartridge at a predetermined height relative to the chassis base plate 6.

The disc rotating driving unit 2, adapted for rotationally driving the optical disc 202 of the optical disc cartridge 201 loaded on the cartridge loading section 1, is provided at a mid part of the chassis base plate 6 of the cartridge loading section 1. The disc rotating driving unit 2 is provided with a driving motor 9 mounted on the lower surface of the chassis 6 and having a driving shaft operated as a spindle shaft 10 protruded above the upper surface of the chassis 6. A disc table 11, on which the optical disc 202 is set, is mounted as one with the distal end of the spindle shaft. The disc table 11 is provided with a disc-sucking magnet 12 for holding the chucking hub 202a of the optical disc 202 under magnetic attraction.

The optical pickup device 4 is also mounted on the chassis base plate 6. The optical pickup device 4 is provided with an object lens 13 facing the signal recording surface of the optical disc 202 set on the disc table 11 for converging a light beam from a light source onto the signal recording surface of the disc. That is, the optical pickup device 4 is supported by feed guide shafts 15, 16 provided within a mounting hole 14 provided at a mid part of the chassis base plate 6. The optical pickup device 4, supported in this manner, is moved radially of the optical disc 202 along the feed guide shafts 15, 16 by a linear motor unit constituted by magnets 17, 18 provided within the mounting hole 14 and a driving coil 19.

Figure 9:
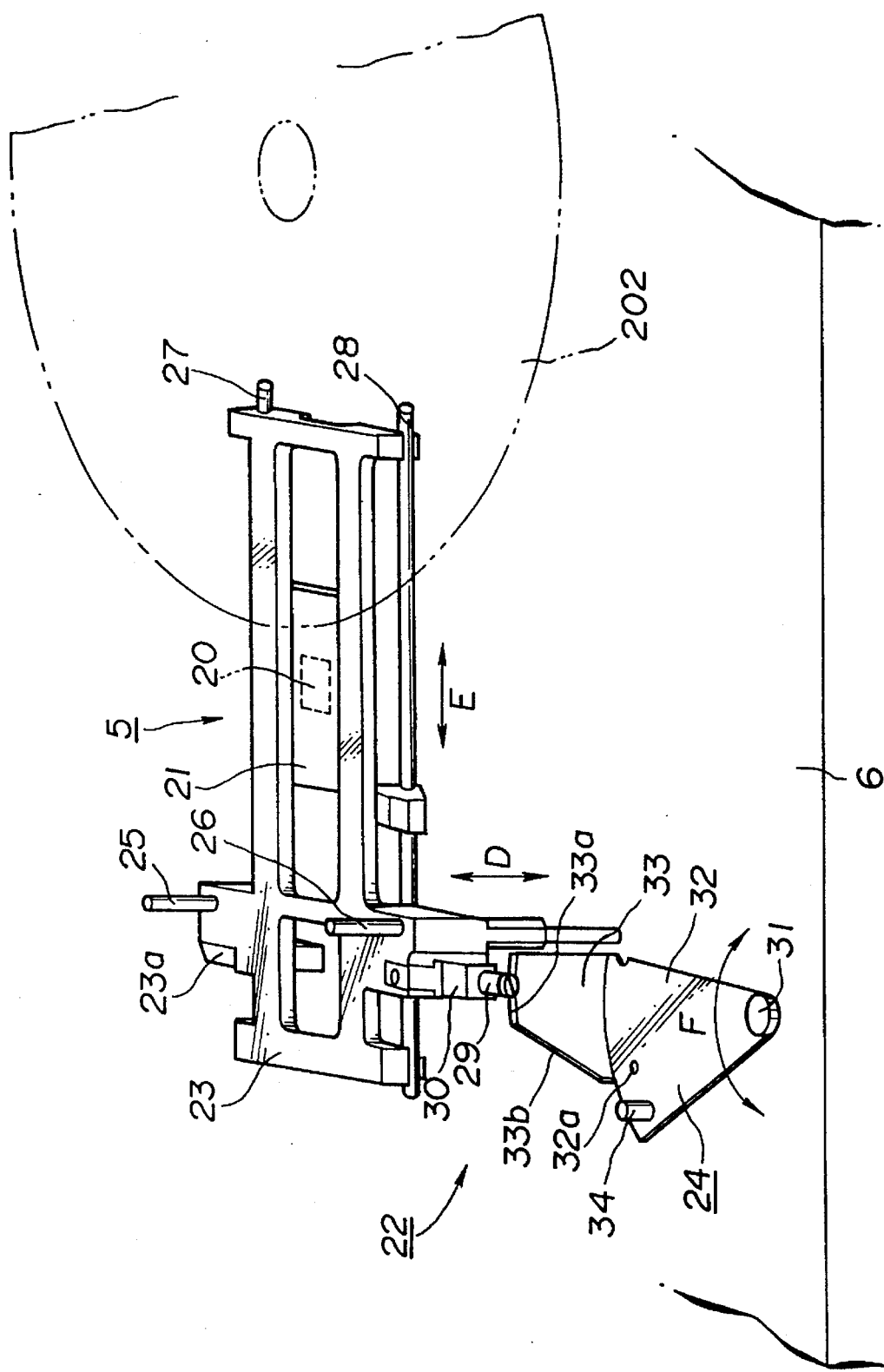
FIG. 9 is a perspective view showing the state of a lifting unit for the magnetic head device during ejection of the disc recording and/or reproducing apparatus shown in FIG. 3.

The magnetic head device 5, moved radially of the optical disc 202 across its inner and outer peripheries thereof in synchronism with the optical pickup device 4, is connected to the optical pickup device 4. As shown in FIG. 9, the magnetic head device 5 is provided with a magnetic head 20 provided with a coil for generating a magnetic field of a predetermined intensity on the signal recording section of the optical disc 202. The magnetic head 20 is attached to a shifting member 21 movable relative to a magnetic head lift member of the magnetic head device lifting unit which will be explained subsequently.

The magnetic head shifting member 21 is provided with a distance sensor, not shown, for maintaining a constant distance between the magnetic head 20 and the optical disc 202. As shown in FIG. 5, the magnetic head shifting member 21 is provided with connecting members 21a, 21b depending towards the optical pickup device 4, so that the lower ends of the connecting members 21a, 21b are connected to the optical pickup device 4. Thus the magnetic head shifting member 21 is moved radially across the inner and outer peripheries of the optical disc 202 in synchronism with the optical pickup device 4 so that the magnetic head 20 is caused to face the object lens 13 of the optical pickup device 4 at all times via the optical disc 202.

The above described magnetic head device 5 is adapted for being moved vertically relative to the major surface of the optical disc 202, that is in a direction towards and away from the optical disc 202, by the magnetic head lifting unit 22. The magnetic head lifting unit 22 is made up of a magnetic head lifting member 23 supporting the magnetic head shifting member 21 provided with the magnetic head 20, and a vertically movable magnetic head lifting lever 24 adapted for moving the magnetic head lifting member 23 substantially vertically with respect to the major surface of the optical disc 202.

The magnetic head lifting member 23 is supported for movement vertically, that is in a direction towards and away from the chassis base plate 6, as indicated by an arrow D in FIG. 9, by lifting shafts 25, 26 provided upright on the chassis base plate 6 in a manner free from abutment against the optical disc cartridge 201. On the side of the magnetic head lifting member 23 facing the optical pickup device 4 are mounted supporting shafts 27, 28 so that the axes thereof run parallel to the major surface of the optical disc 202 and in alignment with the radial direction of the optical disc 202. An engaging pin 29 engaged with the magnetic head lifting lever 24 adapted for vertically moving the magnetic head lifting member 23 is provided in proximity to the lifting shaft 26 of the magnetic head lifting member 23. The engaging pin 29 is provided at the distal end of an attachment member 30 provided for depending from one side of the magnetic head lifting member 23.

The magnetic head lifting lever 24 for vertically shifting the magnetic head lifting member 23 while being engaged with the engaging pin 29 is mounted on the chassis base plate 6 for rotation about a shaft 31 as a center of rotation, as shown by an arrow F in FIG. 9. The magnetic head lifting lever 24 is made up of a sector-shaped slide contact section 32, adapted for being moved in sliding contact with the chassis base plate 6, and a vertically movable guide section 33 upstanding from the slide contact section 32. The slide contact section 32 is provided with a minor boss 32a for facilitating a sliding contact of the contact section 32 with the chassis base plate 6, so that the slide contact section 32 may be contacted with a point contact with the chassis base plate 6. A lever operating pin 34 is adapted for being fitted to an operating member adapted in turn for operating the magnetic head lifting lever provided on the ejection plate of the disc loading unit 3 as later described.

Figure 10:
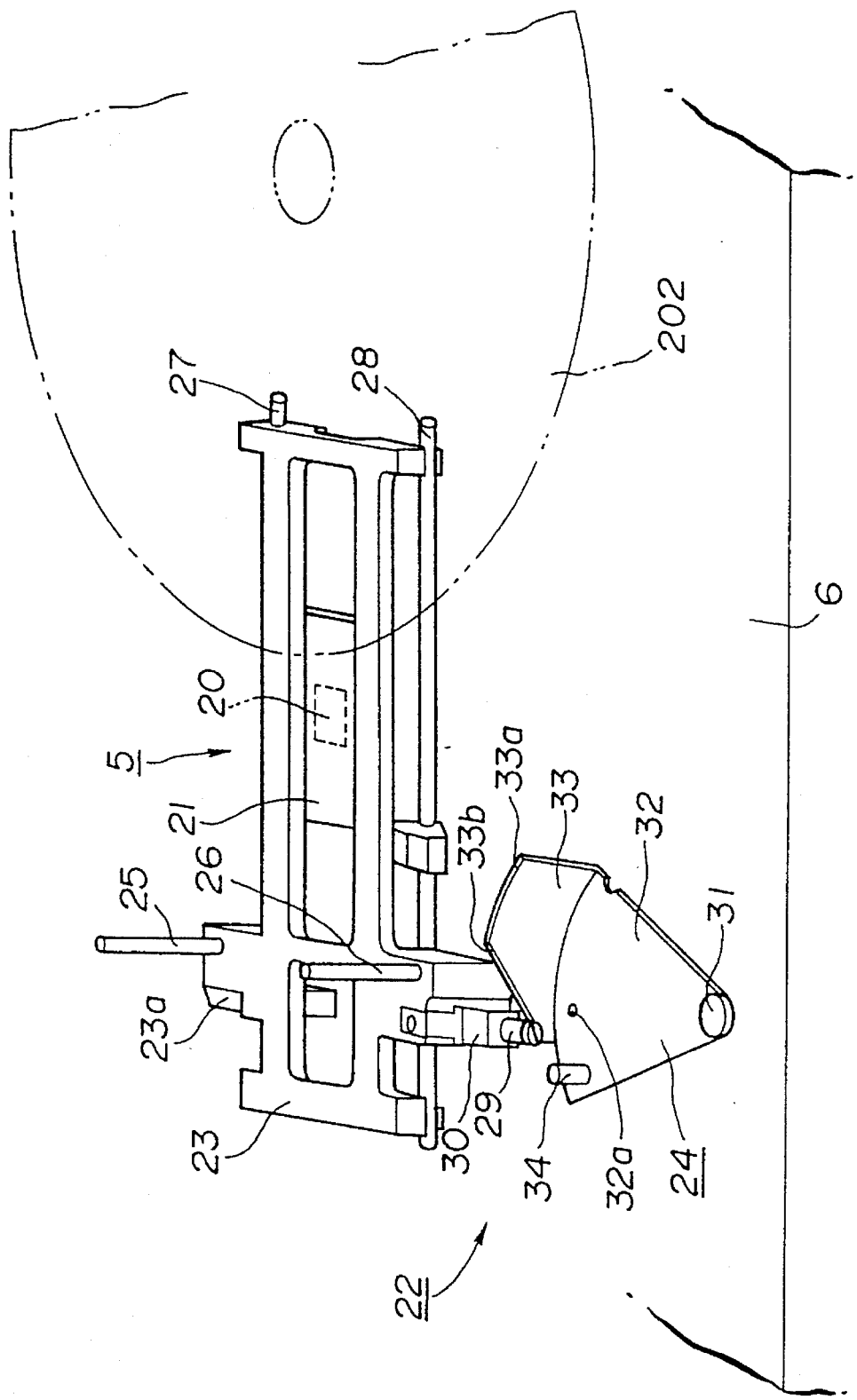
FIG. 10 is a perspective view showing the state of the lifting unit for the magnetic head device during loading of the disc recording and/or reproducing apparatus shown in FIG. 3.

The vertically movable guide section 33 has an upright wall, the upper end of which is engaged with the engaging pin 29, and is made up of a parallel section 33a parallel to the chassis base plate 6 and an inclined section 33b inclined from the parallel section 33a towards the slide contact section 32. That is, in the eject state, the engaging pin 29 is engaged with the parallel section 33a, as shown in FIG. 9, so that the magnetic head lifting member 23 is spaced apart from the optical disc 202 and is kept at a position of not abutting the magnetic head 20 against the optical disc cartridge 201 when the optical disc cartridge 201 is in the inserted position. Conversely, in the loaded state, when the engaging pin 29 is engaged with the lower end of the inclined section 33b, the engaging pin 29 is engaged with the lower end of the inclined section 33b, as shown in FIG. 10, so that the magnetic head lifting member 23 is close to the optical disc 202, and hence the magnetic head 20 is maintained at such a height that a magnetic field may be applied to the signal recording layer of the optical disc 202.

Thus the magnetic head shifting member 21, moved radially across the inner and outer peripheries of the disc by being mounted on the magnetic head lifting member 23, is also moved substantially vertically relative to the signal recording surface of the optical disc 202, that is, between a position approaching the optical disc 202 and a position spaced apart from the disc 202, by the engaging pin 29 being slid between the parallel section 33a and the inclined section 33b by rotation of the vertically movable magnetic head lifting lever 24.

In the vicinity of the lifting shaft 25 of the magnetic head lifting member 23, there is provided an engaging surface 23a adapted for being engaged with a magnetic head holding unit, as later described, which is adapted for holding the magnetic head lifting member 23 in proximity to the optical disc 202 when the magnetic head shifting member 21 is moved by the magnetic head lifting member 23 to a position close to the optical disc 202. This engaging surface 23a is formed as an inclined surface inclined towards the chassis base plate 6 on the opposite side from the magnetic head shifting member 21.

Referring to FIGS. 3 to 8, the disc loading unit 3 for loading the optical disc cartridge 201 on the cartridge loading section 1 is provided with a cartridge holder 35 into which the optical disc cartridge 201 loaded into the disc recording and/or reproducing apparatus is inserted and maintained in position, a cartridge holder supporting plate 36, an ejecting plate 37 adapted for vertically moving the cartridge holder 35 relative to the cartridge loading section 1 and moving the cartridge holder 35 to a position of ejecting the optical disc cartridge 201, and an ejecting plate driving unit 38 for shifting the ejecting plate 37.

Figure 7:
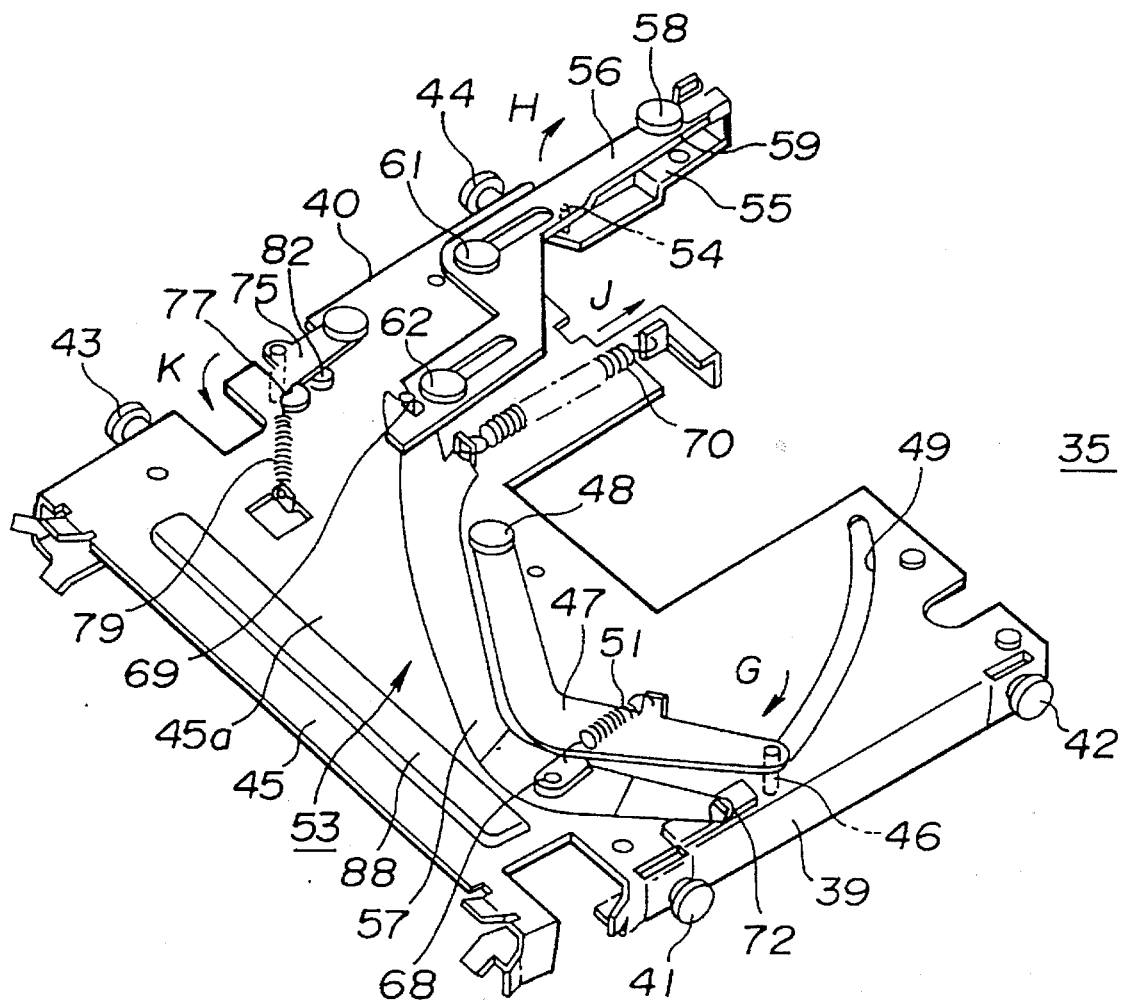
FIG. 7 is a perspective view showing the construction of a cartridge holder of the disc recording and/or reproducing apparatus shown in FIG. 3.
Figure 11:
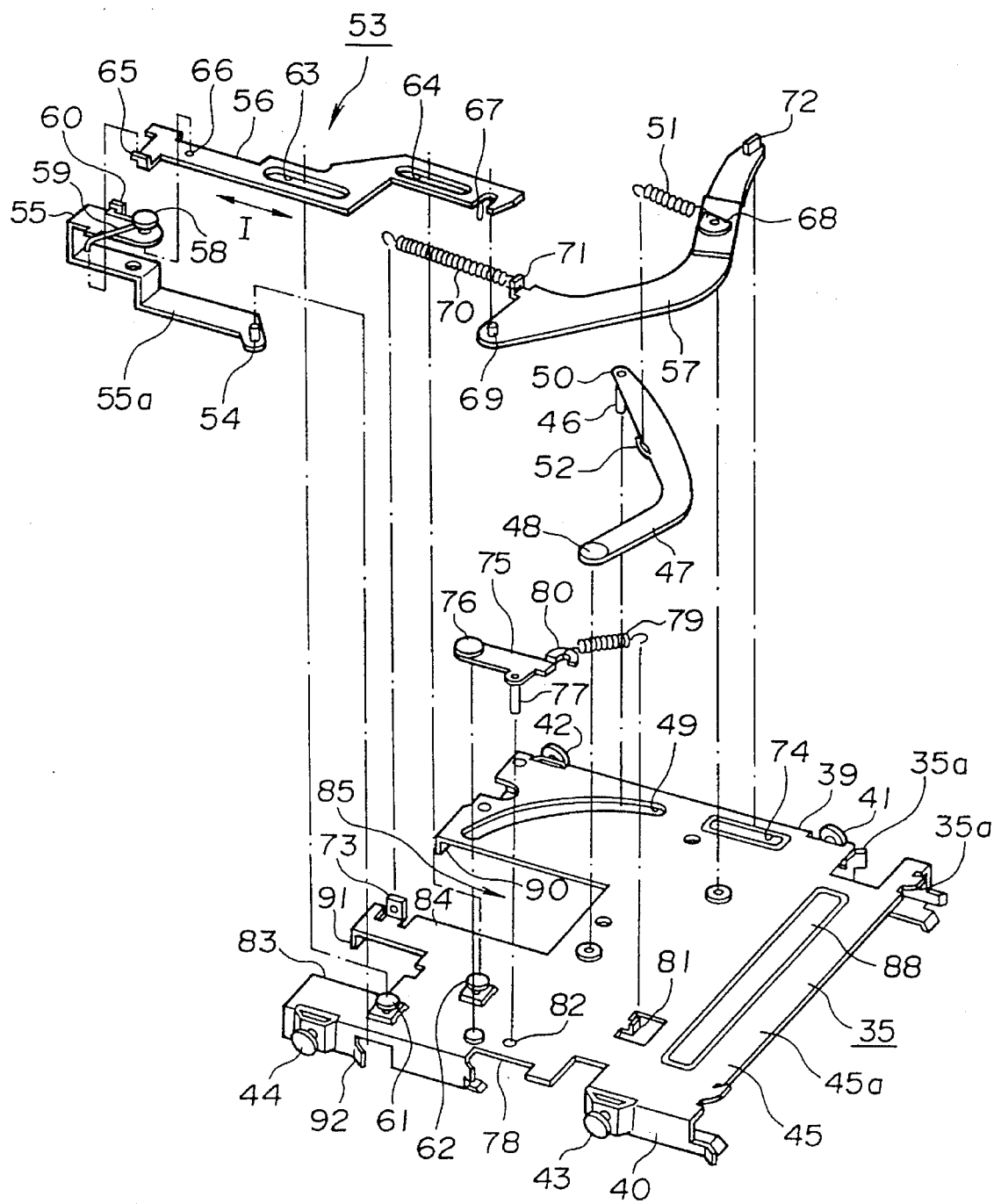
FIG. 11 is an exploded perspective view of the cartridge holder shown in FIG. 7.
Figure 12:
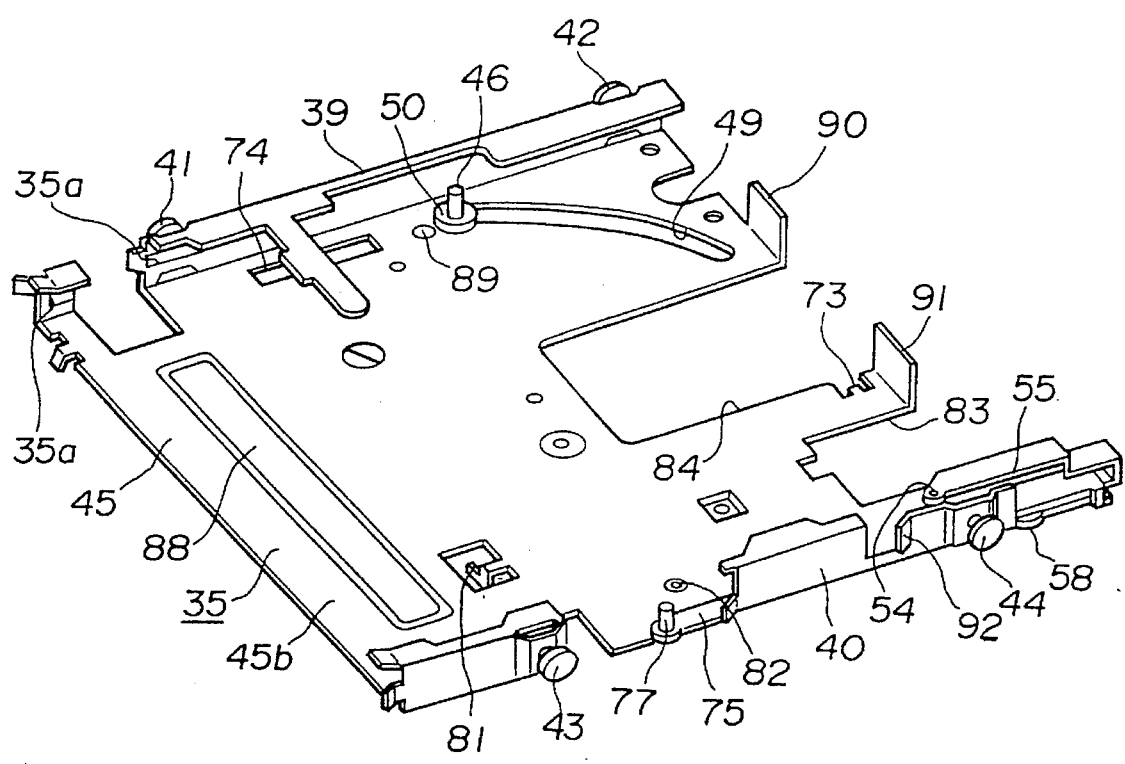
FIG. 12 is a perspective view showing the state of the cartridge holder of FIG. 7, as viewed from the back side.
Figure 13:
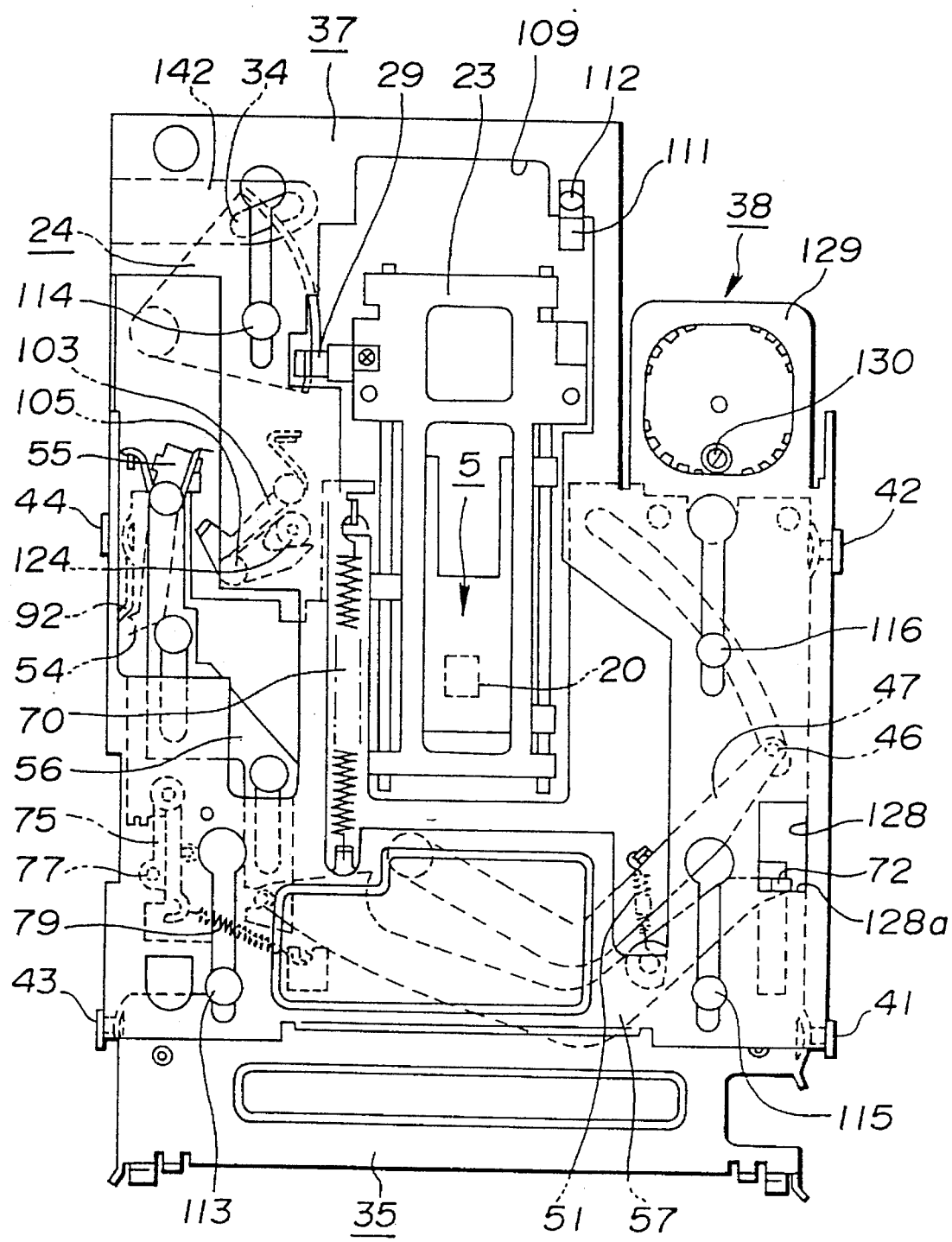
FIG. 13 is a plan view showing the state during ejection of the essential part of the disc recording and/or reproducing apparatus shown in FIG. 3.
Figure 14:
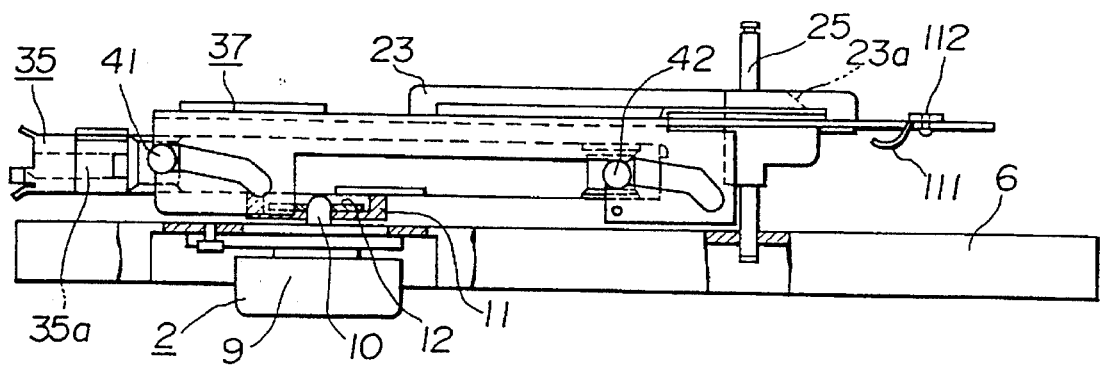
FIG. 14 is a right side view showing the state during ejection of the essential part of the disc recording and/or reproducing apparatus shown in FIG. 3.
Figure 15:
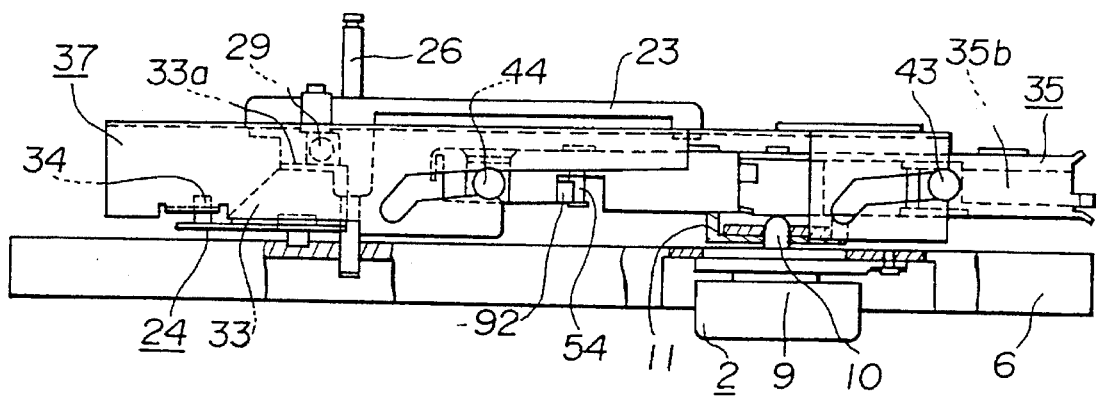
FIG. 15 is a left side view showing the state during ejection of the essential part of the disc recording and/or reproducing apparatus shown in FIG. 3.

Referring to FIGS. 7, 11 and 12, the cartridge holder 35 is formed as a thin casing by bending a plate member for defining an inner space in which to hold the optical disc cartridge 201 inserted from the direction shown by an arrow a in FIG. 1. A cartridge loading opening for introducing the optical disc cartridge 201 into the inside of the cartridge holder 35 is 6.5 mm in width and 90.5 mm in length. On the opposite sides of the cartridge holder 35, cartridge holding sections 39, 40, having substantially U-shaped cross-section, are formed, and vertical guide pins 41, 42, 43, 44 are formed on the outer lateral sides of the cartridge holding sections 39, 40. These vertical guide pins 41 to 44 are adapted for being introduced into vertical guide grooves provided in a holder supporting plate 36 and an ejection plate 37.

Figure 16:
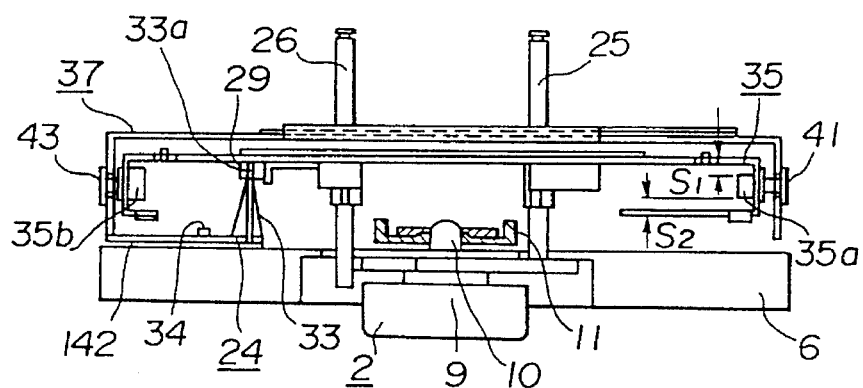
FIG. 16 is a front view showing the state during ejection of the essential part of the disc recording and/or reproducing apparatus shown in FIG. 3.
Figure 17:
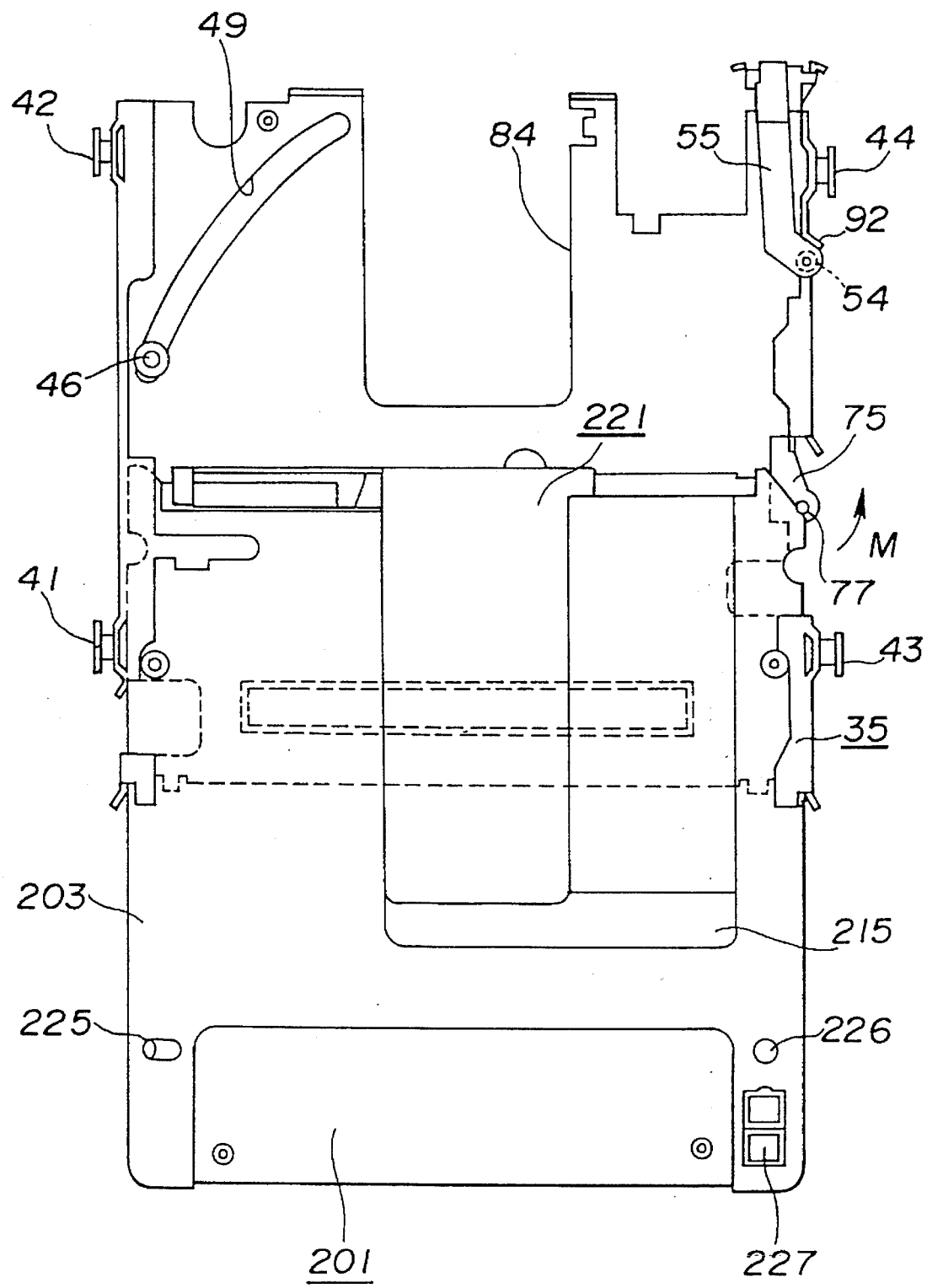
FIG. 17 is a plan view showing the engaging state of a mistaken insertion inhibiting pin with the cartridge holder of an optical disc cartridge in the loaded state.
Figure 18:
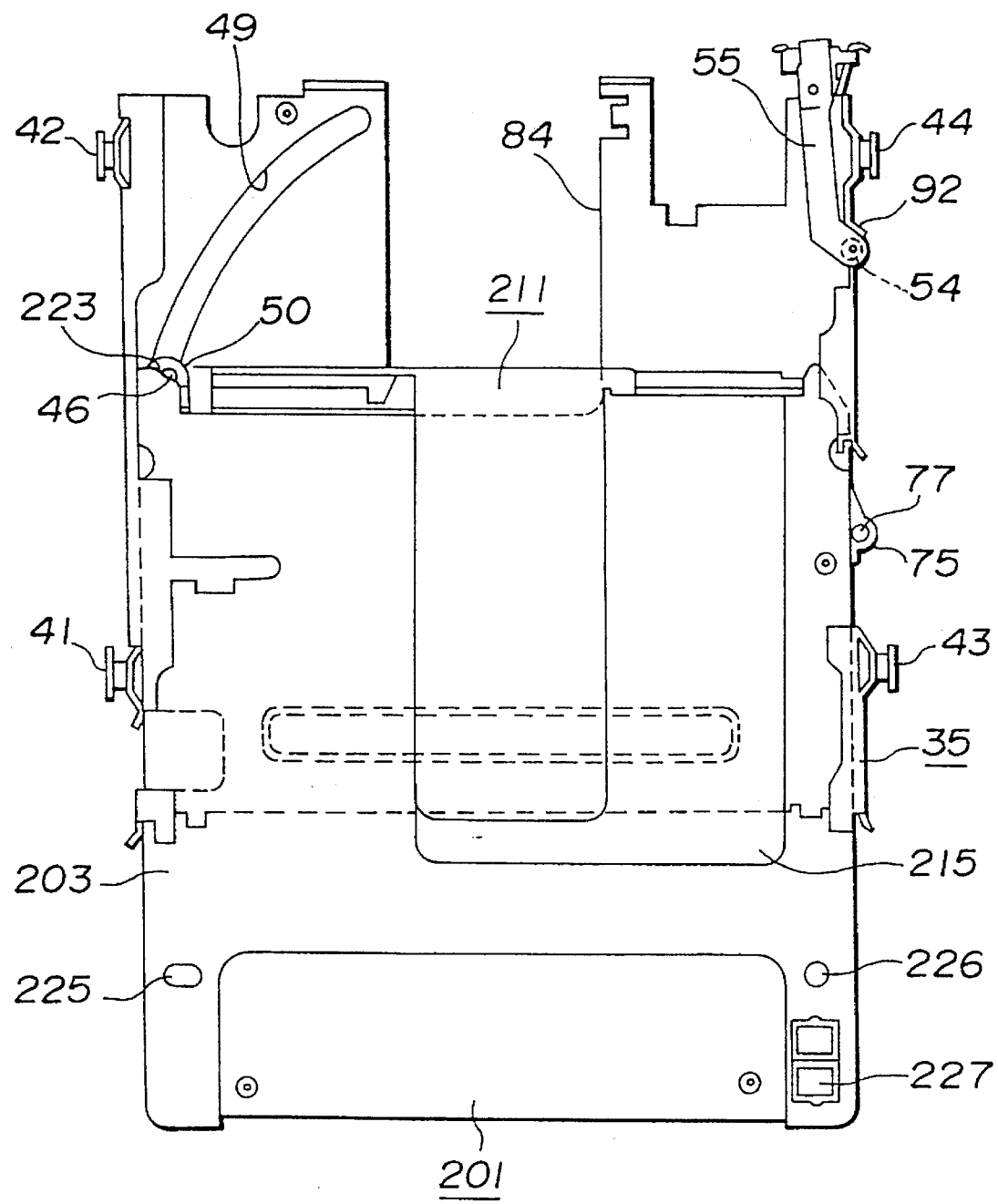
FIG. 18 is a plan view showing the engaging state of a shutter opening pin with the cartridge holder of an optical disc cartridge in the loaded state.

On the sides of the cartridge holding sections 39, 40 facing the inner side of the cartridge holder 35, mistaken insertion inhibiting members 35a, 35b are provided, as shown in FIG. 16. These mistaken insertion inhibiting members 35a, 35b are in the form of bars of a reduced thickness and are mounted at a mid part along the width of each of the cartridge holding sections 39, 40 so that the longitudinal direction of the mistaken insertion inhibiting members is aligned with the inserting direction of the optical disc cartridge 201. The mistaken insertion inhibiting members 35a, 35b are each 3.5 mm in width and 0.5 mm in thickness. Thus a cartridge inserting slit, which is an entrance into the inside of the cartridge holder 35, is divided into two slit sections, each being 1.5 mm in height, as shown by arrows S1, S2 in FIG. 16, at both ends thereof provided with the mistaken insertion inhibiting members 35a, 35b, so that the cartridge inserting slit is narrower than the cartridge main body 203 having a width of 3 mm, The length at the center of the cartridge inserting slit along its width is equal to the distance between the mistaken insertion inhibiting members 35a, 35b, that is, 89 mm. Thus the cartridge inserting slit is narrower in width than the cartridge main body 203 which is 90 mm in width.

A shutter opening lever 47 is rotatably mounted on an upper plate section 45 of the cartridge holder 35. The shutter opening lever 47 is provided with a shutter opening pin 46 which is slid with respect to the front side 209 of the optical disc cartridge 201 inserted into this cartridge holder 201 for opening the shutter member 211.

The shutter opening lever 47 is substantially L-shaped and has its proximal end rotatably supported by a first supporting shaft 48 on a mid part of an upper surface 45a of the upper plate section 45. The shutter opening pin 46 for opening the shutter member 211 is mounted upright on the distal end of the shutter opening lever 47. The shutter opening pin 46 is caused to depend into the inside of the cartridge holder 35 via a shutter opening pin guide groove 49 formed in the upper plate section 45 along a trajectory of the shutter opening lever 47 about the first supporting shaft 48. The guide groove 49 is of a width slightly larger than the diameter of the shutter opening pin 46 to facilitate movement of the shutter opening pin 46. A shutter opening pin escape inhibiting member 50, operating as means for preventing the shutter opening pin from riding on the shutter member 211, is provided at the proximal end of the shutter opening pin 46. The member 50 is formed as a toroidal-shaped washer of a size large enough to stride over the guide groove 49, and is inserted over the shutter opening pin 46 while being kept in contact with an inner surface 45b of the upper plate section 45. In this manner, the shutter opening pin 46 has its position with respect to the guide groove 49 regulated by the pin escape inhibiting member 50 so that it may be moved within the guide groove 49 without being thrust outwardly of the cartridge holder 35. Thus the shutter opening pin 46 may be positively slid towards the front side 109 of the first cartridge main body 203 for opening the shutter member 211 without riding thereon.

The shutter opening lever 47 is rotationally biased by a first tension coil spring 51 in a direction of shifting the shutter opening pin 46 towards the load/unload opening of the optical disc cartridge 201 as shown by an arrow G in FIG. 7. The first tension coil spring 51 has its one end retained by a first spring retainer 52 formed by segmenting a part of the shutter opening lever 47, while having its other end retained by a third supporting shaft 68 provided on an entraining lever 57 as later described for positioning the shutter opening lever 46 at an initial position, namely at an starting position of the guide groove 49.

The upper plate section 45 of the cartridge holder 35 is provided with a disc cartridge entraining unit 53 whereby, when the optical disc cartridge 201 is inserted into the cartridge holder 35, the optical disc cartridge 201, which has been manually introduced as far as a predetermined position within the cartridge holder 35, may be automatically entrained to a loaded position. This entraining unit 53 is made up of an entraining member 55, provided with an entraining pin 54 adapted to be engaged with an opening 228 formed in the optical disc cartridge 201, an entraining lever 56 for rotatably supporting the entraining member 55 and an operating lever 57 for reciprocating the entraining lever 56.

The entraining lever 56 is mounted on the upper plate section 45 so that it may be moved along the optical disc cartridge loading/unloading direction relative to the cartridge holder 35 shown by an arrow I in FIG. 11 by being engaged with guide shafts 61, 62 mounted upright on the upper surface 45a of the upper plate section 45 of the cartridge holder 35. Thus the entraining member 55 is formed with elongated guide grooves 63, 64 in register with the guide shafts 61, 62, which are inserted into and engaged with these guide grooves for supporting the entraining lever 56 by the entraining member 55. A third spring retainer 65, adapted to be engaged by the other end of a first coil spring 59 as later explained, and a hole 66 for attachment of a second supporting shaft 58, are formed at an end of the entraining lever 56 associated with the rear end of the cartridge holder 35. An engaging notch 67 engaged by an engaging pin 69 adapted for reciprocating the operating lever 57 is formed at the other end of the entraining lever associated with the forward side of the cartridge holer 35.

The entraining member 55 is substantially U-shaped and has its upper part supported by the entraining lever 56 while having its lower part formed as a substantially L-shaped extension 55a directed towards the load/unload opening of the disc cartridge 201. The entraining member 55 has its upper part rotatably supported by the second supporting shaft 58 by the one end part of the entraining lever 56, The first torsion coil spring 59 is attached to the first supporting shaft 58 for rotatably biasing the entraining pin 54 towards the outer lateral side of the cartridge holding section 40 of the cartridge holder 35 indicated by an arrow H in FIG. 5. The first torsion coil spring 59 has its one end retained by a second spring retainer 60 formed by segmenting a part of the entraining member 55 while having its other end retained by the third spring retainer 65 of the entraining lever 56, The distal end of the extension 55a is projected towards the outer lateral side of the cartridge holding section 40 of the cartridge holder 35 and is formed with an entraining pin 54 which is biased towards the outer lateral side of the cartridge holding section 40 of the cartridge holder 35 by the first torsion coil spring 59.

The operating lever 57 is in the form of a substantially crescent-shaped flat plate having its mid part rotatably supported on the upper surface 45a of the upper plate section 45 of the cartridge holder 35, The operating lever 57 is provided towards the load/unload opening of the disc cartridge 201 in proximity to the shutter opening lever 47. The one end of the operating lever 57 is provided with an engaging pin 69 adapted for being engaged in the engaging notch 67 of the entraining lever 56 and a fourth spring retainer 71 adapted for being engaged with a second tension coil spring 70, while the other end of the operating lever 57 is provided with an engaging lug 72 adapted for being engaged with an ejection plate 37 as later described for causing rotation of the operating lever 57 by this ejection plate.

The operating lever 57 is rotationally biased by the second tension coil spring 70 in a direction of shifting the entraining lever 56 in the inserting direction of the optical disc cartridge 201 as shown by an arrow J in FIG. 7. The second tension coil spring has its one end retained by the fourth spring retainer 71 of the operating lever 57, while having its other end retained by a fourth spring retainer 73 formed by segmenting a part of the upper surface section 45a of the upper plate section 45 of the cartridge holder 35.

In an initial state, the entraining lever 56, engaged with the operating lever 57, causes the entraining pin 54 of the entraining member 55 to be located at a predetermined position.

In an area of the upper plate section 45 of the cartridge holder 35, traversed by the engaging lug 72 by rotation of the operating lever 57, there is provided a leveling inhibiting member 74 for inhibiting leveling of the engaging lug towards the inner side of the cartridge holder 35. The inhibiting member is provided as an upward projection of the upper surface 45a.

On the upper plate section 45 of the cartridge holder 35, there is rotatably mounted a mistaken insertion inhibiting lever 75 for preventing the optical disc cartridge 201 from being inserted in a mistaken direction into the cartridge holder 35. This mistaken insertion inhibiting lever 75 has its proximal side supported at a lateral side of the cartridge holding section 40 of the cartridge holder 35 by fourth supporting shaft 7 so as to be rotated over the upper surface 45a of the upper plate section 45 of the cartridge holder 35. A mistaken insertion inhibiting pin 77 is set on the distal end of the mistaken insertion inhibiting lever 75 and is caused to depend into the inside of the cartridge holder 35 via a notch 78 opened on the lateral side of the cartridge holder 35.

The mistaken insertion inhibiting lever 75 is rotationally biased by third tension coil spring 79 in a direction in which the distal end of the lever 75 is moved towards the inner side of the cartridge holder 35, as indicated by an arrow K in FIG. 7. That is, the third tension coil spring 79 has its one end retained by a sixth spring retainer 80, formed by segmenting a part of the mistaken insertion inhibiting lever 75, while having its other end retained by a seventh spring retainer 81 formed by segmenting a part of the upper plate section 45 of the cartridge holder 35, as shown in FIG. 11. When biased by the third tension coil spring 79, the mistaken insertion inhibiting lever 75 is abutted against a positioning lug 82 formed in proximity to the notch 78 of the cartridge holder 35 for setting the mistaken insertion inhibiting pin 77 at an initial position.

The upper plate section 45 of the cartridge holder 35 is formed with a first notch 83 faced by a holding lever adapted for holding the ejection plate 37 at an eject position and a second notch 84 faced by the magnetic head device 5. The upper plate section 45 is also provided with a raised part 88 for preventing various levers, such as the shutter opening lever 47, operating lever 57 or the mistaken insertion inhibiting lever 75, from being abutted against the holder supporting plate 36 when the cartridge holder 35 is supported by the holder supporting plate 36. The raised part 88 is provided for extending in a direction normal to the inserting direction of the disc cartridge 201 along a lateral side of the upper plate section 45 in the vicinity of the load/unload opening for the optical disc cartridge 201 and is of a thickness at least larger than the thickness of any of the above mentioned levers, such as the shutter opening lever 47.

On an inner surface 45b of the upper plate section 45 of the cartridge holder 35, there is provided, as shown in FIG. 12, a cartridge thrusting member 89, adapted for thrusting the optical disc cartridge 201 inserted into the inside of the cartridge holder 35 downwards, that is towards the disc table 11, for preventing the optical disc cartridge 201 from riding over the opening pin escape inhibiting member 50 provided on the shutter opening pin 46. This cartridge thrusting member 89 is provided in the vicinity of the shutter opening pin 46 in its initial position and has a projecting height not less than the thickness of the opening pin escape inhibiting member 50 to assure the prevention of riding of the optical disc cartridge 201 over the opening pin escape inhibiting member 50.

The upper plate section 45 of the cartridge holder 35 is formed with position regulating lugs 90, 91 for preventing the optical disc cartridge 201 inserted into the cartridge holder 35 from being introduced further beyond the loading position. These position regulating lugs 90, 91 are formed by bending a part of the rear side of the upper plate section 45 in the vicinity of the second notch 84 into the inside of the cartridge holder 35.

The lateral side of the cartridge holding section 40 of the cartridge holder 35 is formed with a position regulating tongue 92 adapted for holding the entraining pin 54 in its initial position in the eject state. This position regulating tongue 92 is adapted for holding the entraining pin 54 in the eject state in an outwardly deflected position out of abutting contact with the optical disc cartridge 201 introduced into the cartridge holder 35.

Referring to FIG. 4, a cartridge holder supporting plate 36, adapted for supporting the cartridge holder 35, is formed as a casing having a size large enough to hold the cartridge holder 35 therein, and is provided with supporting lateral wall sections 93, 94 for vertically movably supporting the cartridge holder 35. These wall sections 93, 94 are provided with vertical guide grooves 95, 97; 96, 98 in which are slidably engaged vertical guide pins 41, 42, 43 and 44 provided on the cartridge holder 35. Of these guide grooves 95 to 98, the guide grooves 95 and 97, provided towards the load/unload opening for the optical disc cartridge 201, are formed as a slit extending parallel to spindle shaft 10 of the disc rotating driving unit 2 and having a width large enough to accommodate the guide pins 41, 43. The remaining guide grooves 96, 98 are formed as slits of a wider width extending parallel to the spindle shaft 10. The inner side vertical guide pins 42, 44 are adapted for being slidably engaged with lateral sides 96a, 98a of these guide grooves 96, 98. That is, the vertical guide pins 41, 43 towards the load/unload opening of the optical disc cartridge 201 are engaged with the vertical guide grooves 95, 97 facing thereto, while the inner guide grooves 42, 44 are adapted for being engaged with the lateral sides 96a, 98a of the remaining vertical guide grooves 96, 98.

The lower ends of the supporting wall sections 93, 94, formed with the vertical guide grooves 95 to 98, are formed with inwardly extending attachment lugs 99, 100, 101 and 102 adapted for attaching the holder supporting plate 36 to the chassis base plate 6. That is, the holder supporting plate 36 is secured to the chassis base plate 6 by securing the attachment lugs 99 to 102 by set screws or the like to the chassis base plate 6.

A holding lever 103 is rotatably mounted on the holder supporting plate 36 for holding the ejection plate 37 in the eject position against the force of the tension coil spring. The holding lever 103 is rotatably mounted by having its proximal end supported by the fifth supporting shaft 104. The foremost part of the holding lever 103 is formed with an engaging pawl 103a adapted for being engaged with an ejection plate retention member provided on the ejection plate 37 for holding the ejection plate 37 in its eject position. A holding lever rotating pin 105 is mounted upright on the proximal end of the holding lever 103 for rotating the holding lever 103. This rotating pin 105 is caused to descend into the inside of the cartridge holder 35 via notch 83 opened on the lateral side of the cartridge holder 35. The rotating pin 105 is adapted to descend at least to a position in which the distal end of the rotating pin 105 is abutted against the optical disc cartridge 201 inserted into the cartridge holder 35.

Figure 6:
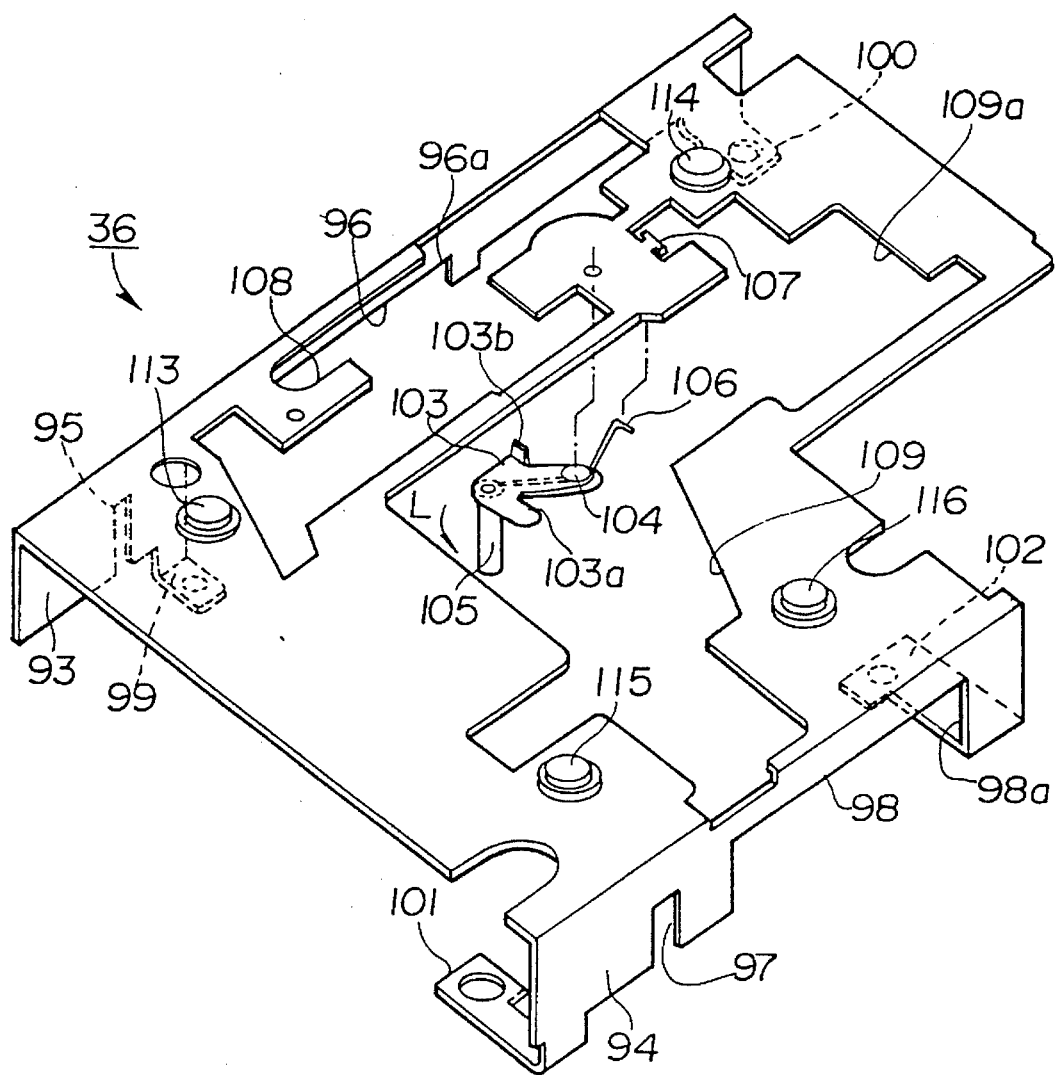
FIG. 6 is a perspective view showing the construction of a cartridge holder supporting plate of the disc recording and/or reproducing apparatus shown in FIG. 3.

The holding lever 103 is rotationally biased by a second torsion coil spring 106 in a direction shown by an arrow L in FIG. 6 in which the holding leer rotating pin 105 is rotated in a direction opposite to the direction of insertion of the optical disc cartridge 201. This second torsion coil spring 106 has its one end retained by the proximal end of the rotating pin 105 and has its other end retained by an eighth spring retainer 107 formed by segmenting a part of the holder supporting plate 36. When the retention pawl 103a is disengaged from the ejection plate retention member, the holding lever 103 is regulated in its rotation by having a lug 103b retained by the holder supporting plate 36.

Meanwhile, the holder supporting plate 36 is provided with a third notch 108, faced by the entraining lever 56, a fourth notch 109, faced by the magnetic head device 5 and slide pins 113, 114, 115 and 116 for causing the ejection plate 37 to be slid in the load/unload direction of the optical disc cartridge 201.

Figure 8:
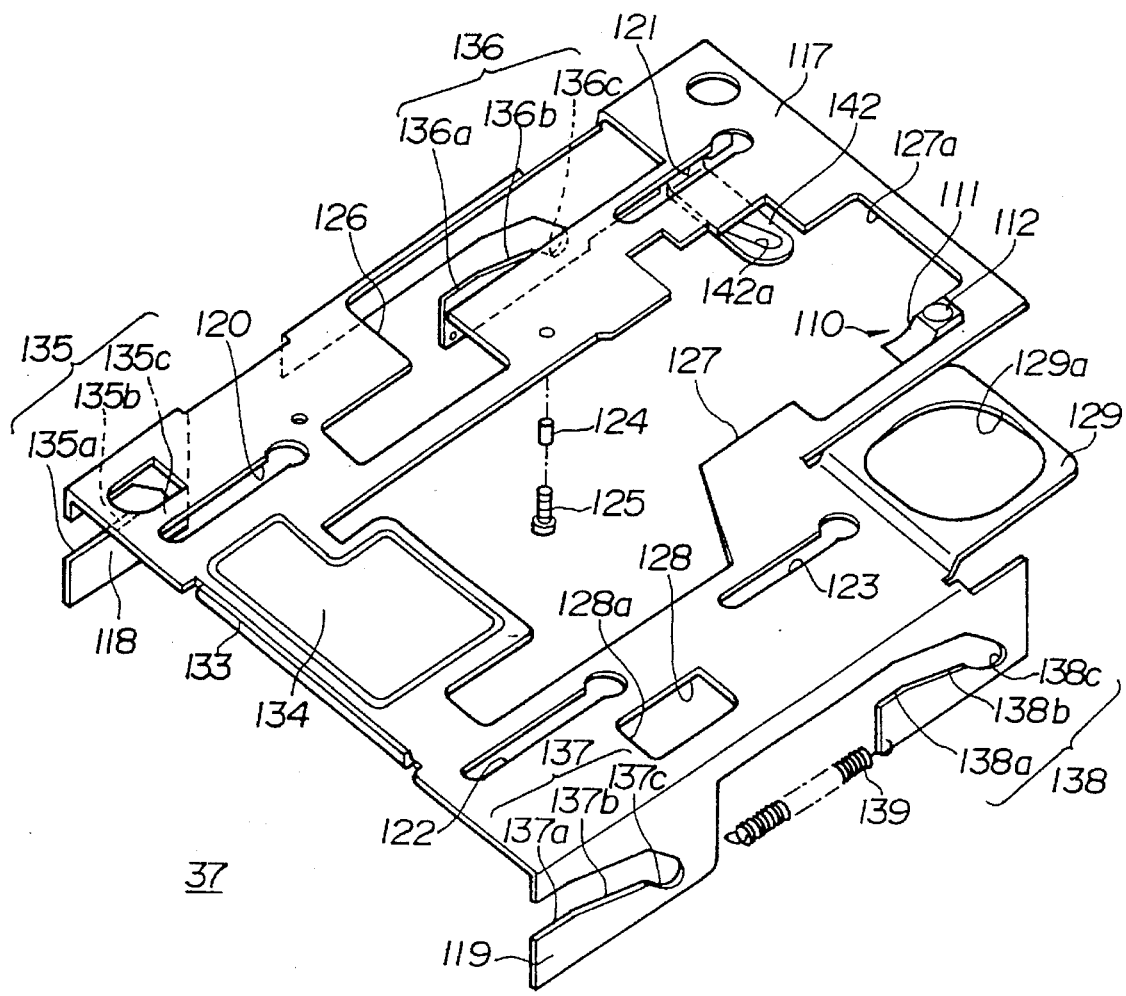
FIG. 8 is a perspective view showing the construction of an ejection plate of the disc recording and/or reproducing apparatus shown in FIG. 3.

The above mentioned ejection plate 37 is movably mounted with respect to the holder supporting plate 36. Referring to FIG. 8, the ejection plate 37 includes a planar slide section 117, adapted for being slid relative to the holder supporting plate 36, and upright wall sections 118, 119 provided on both sides of the slide section 117 for depending towards the disc rotating driving unit 2. The slide section 117 is formed with slide slits 120, 121, 122 and 123, engaged by slide pins 113, 114, 115 and 116, provided on the holder supporting plate 36, respectively. These slide slits 120 to 123 are formed as elongated through-holes provided for extending along the disc cartridge loading/unloading direction so as to be in register with the slide pins 113 to 116.

The slide section 117 is also provided with an ejection plate retention member 124 adapted for being engaged with the holding lever 103 provided on the holder supporting plate 36. This ejection retention member 124 is formed as a cylinder of a size large enough to be retained by an engaging pawl 103a of the holding lever 103 and is rotatably mounted on the slide section 117 by a set screw 125 threadedly engaged with a central tapped hole formed in the cylinder.

The slide section 117 is also formed with a fifth notch 126, faced by the entraining lever 56, a sixth notch or aperture 127, faced by the magnetic head device 5 and a seventh notch or aperture 128 faced by rotating engaging lug 72 of the entraining lever 57 provided on the cartridge holder 35. On a lateral side 127a of the sixth notch 127, there is provided a magnetic head holding mechanism 110 which is projected into the inside of the aperture 127 and which is adapted for holding the magnetic head device 5 at a preset height from the signal recording surface of the optical disc 202 when the magnetic head device 5 is at a recording position proximate to the optical disc 202. The magnetic head holding mechanism 110 is constituted by a plate spring 111 having a U-shaped end which is slidingly engaged by engaging surface 23a of the magnetic head lifting member 23 for thrustingly holding the magnetic head lifting member 23 when the magnetic head device 5 is moved to the recording position proximate to the optical disc 202. Meanwhile, the plate spring 111 is secured to the ejection plate 37 by a set screw 112 at the proximal end of the spring 111.

It is noted that a lateral side 128a of the aperture 128, directed towards the load/unload opening of the disc cartridge 201, is adapted for being engaged by the lug 72 which is intruded into the aperture 128 when the ejection plate 37 is moved to an eject position for rotating the entraining lever 57.

An operating section 129, adapted for being engaged by a slide pin of the ejection plate driving unit 38 adapted for sliding the ejection plate 37 to an eject position, is provided at the back of the aperture 128 in the direction of insertion of the disc cartridge 201. The operating section 129 is a substantially square-shaped flat plate which is provided along the rear lateral side of the slide section 117. Meanwhile, the operating section 129 is provided with a substantially circular aperture 129a adapted for being engaged by the above mentioned slide pin.

Referring to FIG. 4, the ejection plate driving unit 38, provided with a slide pin engaged with the pin engaging aperture 129a, is provided with an ejection motor, not shown, provided below the chassis base plate 6, and an operating gear 131 rotationally driven by the motor and provided with a slide pin 130. The ejection motor is coupled to the gear 130 by a gearing 132. The slide pin 130 is set at an offset position on the operating gear 130. The ejection plate driving unit 38 is so arranged and constructed that, when an eject button, not shown, is actuated, with the optical disc cartridge 201 loaded on the cartridge loading section 1, for driving the ejection motor for rotationally driving the operating gear 131, the slide pin 130 is slidingly contacted with the rim of the aperture 129a of the ejection plate 37 for slidingly shifting the ejection plate 37 for shifting the ejection plate 37 to its eject position against the force of a tension coil spring 70 provided on the entraining lever 57 and another tension coil spring provided between the ejection plate 37 and the chassis base plate 6 as later described. Meanwhile, if the ejection plate 37 is not in its eject position, the slide pin 130 is rotated to a position of not being slidingly contacted with the pin engaging aperture 129a.

It is noted that the lateral side towards the optical disc cartridge load/unload opening of the slide section 117 is formed with an upright section 133 and a raised section 134 at the back of the upright section.

The upright wall sections 118, 119 on both sides of the slide section 117 are formed with vertical slide notches 135, 136, 137, 138 for vertically shifting the cartridge holder 35 relative to the cartridge loading section 1 and shifting the cartridge holder to the optical disc cartridge ejecting position. These notches 135, 136, 137 and 138 are made up of horizontal portions 135a, 136a, 137a and 138a, extending parallel to the optical disc cartridge loading/unloading direction, moderately downwardly sloped portions 135b, 136b, 137b and 138b and acutely downwardly sloped portions 135c, 136c, 137c and 138c, respectively. The cartridge holder 35, thus supported by the chassis base plate 6 by having the vertical guide pins 41, 42, 43 and 44 inserted into and guided along the vertical slide notches 135, 136, 137 and 138, may be moved along the axis of the spindle shaft 10 of the disc rotating driving unit 2, that is vertically relative to the cartridge loading section 1, while being moved to an eject position of ejecting the optical disc cartridge 201.

Meanwhile, fourth tension coil springs 139, 139 for perpetually biasing the ejection plate 37 towards the load/ unload opening of the disc cartridge 201 are mounted in the notches 136, 138 of the upright wall sections 118, 119 of the ejection plate 37 at a trailing side with respect to the optical disc cartridge inserting direction. Meanwhile, one of the tension coil springs in omitted from the drawing. Each of these tension coil springs 139 has its one end retained by the upright wall sections 118, 119 and its other end retained by spring retention pins 140, 141 mounted upright on the chassis base plate 6 for perpetually biasing the ejection plate 37 towards the disc cartridge loading/unloading opening.

At the trailing side relative to the optical disc cartridge inserting direction, the upright wall section 118 of the ejection plate 37 is formed with a lever operating member 142 adapted for being fitted into the lever operating pin 34 of the magnetic head lifting lever 24 rotatably supported by the chassis base plate 6 for rotating the lever 24. The lever operating member 142 is provided for extending from the lateral side of the lower side of the upright wall section 118 towards the other upright wall section 119 parallel to the slide section 117. An elongated operating pin guide slit 142a adapted for being engaged by the lever operating pin 34 is formed in the vicinity of the distal end of the lever operating member 142. With the lever operating pin 34 being engaged in the operating pin guide slit 142a of the lever operating member 142, and the ejection plate 37 being moved, the magnetic head lifting lever 24 is rotated for shifting the magnetic head lifting member 23 in a direction substantially normal to the signal recording surface of the optical disc 202, that is between the position of approaching the disc and the position of being displaced away from the disc.

Referring to FIGS. 13 to 27, the operation of loading the optical disc cartridge 201 onto the above described disc recording and/or reproducing apparatus is explained.

The state prior to loading of the disc cartridge 201 is first explained. For loading the optical disc cartridge 201, the eject button, not shown, is actuated for shifting the ejection plate 37 to its eject position, while shifting the cartridge holder 35 and the magnetic head lifting member 23 fitted with the magnetic head 20 to a raised position displaced from the disc table 11 of the disc rotating driving device 2.

That is, by actuating the eject button, not shown, the ejection plate driving unit 38 is driven so that the slide pin 130 of the driving unit 38 is slidingly engaged with the operating section 129 provided in the ejection plate 37 for shifting the ejection plate 37 towards the optical disc cartridge inserting side against the bias of the fourth coil spring 139 provided between the ejection plate 37 and the chassis base plate 6 and the bias of the tension coil spring provided on the entraining lever 57. The holding lever 103 of the holder supporting plate 36 is engaged with the ejection plate retention member 124 provided on the ejection member 37 for holding the ejection plate 37 in the eject position.

With shifting of the ejection plate 37, the engaging lug 72 of the entraining lever 57, projected into the aperture (seventh notch) 128, is entrained towards the optical disc cartridge inserting side. The entraining lever 56, connected to the entraining actuating lever 57, is slid in the opposite direction, that is towards the load/unload opening of the optical disc cartridge 201, for abutting the entraining pin 54 of the entraining member 55, rotatably supported at the distal end of the entraining lever 56, against the position regulating tongue 92 of the cartridge holder 35, for holding the entraining pin 54 at an outwardly deviated position of not being abutted against the optical disc cartridge 201 introduced into the cartridge holder 35.

Meanwhile, the shutter opening pin 46 is maintained at an initial position by the first tension coil spring 51 provided between the shutter opening lever 47 and the operating lever 57. Similarly, the mistaken insertion inhibiting pin 77 is maintained at an initial position of depending into the inside of the cartridge holder 35 by the third tension coil spring 79 provided between the mistaken insertion inhibiting lever 75 and the cartridge holder 35.

With shifting of the ejection plate 37, the lever operating member 142 provided on the ejection plate 37 is engaged with the magnetic head lifting lever 24 for rotating the magnetic head lifting lever 24 for shifting the magnetic head lifting member 23 to a raised position of being displaced from the disc table 11 of the disc rotating driving unit 2 shown in FIG. 16. In the loaded state, the magnetic head lifting member 23 thrusts the engaging surface 23a of the magnetic head lifting member 23 for holding the lifting member 23 in the recording position. However, this engagement is released when the ejection plate 37 is moved rearward, so that the magnetic head lifting member 23 is raised only against its own gravity. Since the load on the motor of the ejection plate driving unit 38 may be reduced in this manner, it suffices to use an electric motor of a lesser output power.

When the magnetic head lifting member 23 is in its raised eject position, the engaging pin 29 provided on the magnetic head lifting member 23 is engaged with the horizontal portion 33b of the vertical guide section 33 of the magnetic head lifting lever 24, so that, on insertion of the disc cartridge 201, the magnetic head 20 may be maintained at a position of not being abutted against the optical disc cartridge 201.

Figure 19:
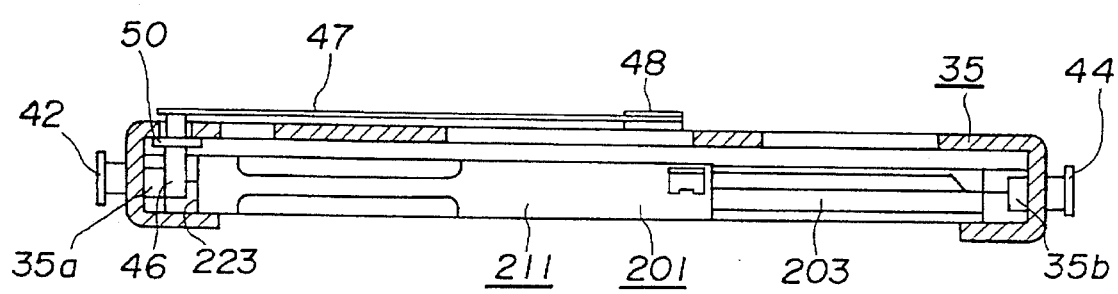
FIG. 19 is a longitudinal cross-sectional view showing the state of insertion of the shutter opening pin into the optical disc cartridge shown in FIG. 17.
Figure 20:
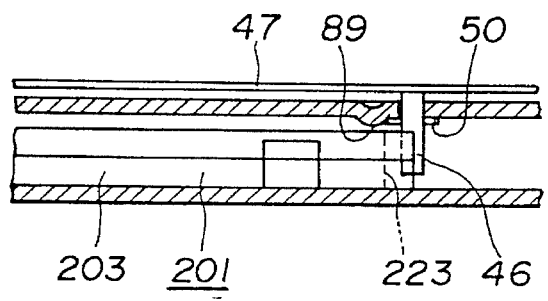
FIG. 20 is a longitudinal cross-sectional view showing the state of insertion of the shutter opening pin into the optical disc cartridge shown in FIG. 17.
Figure 21:
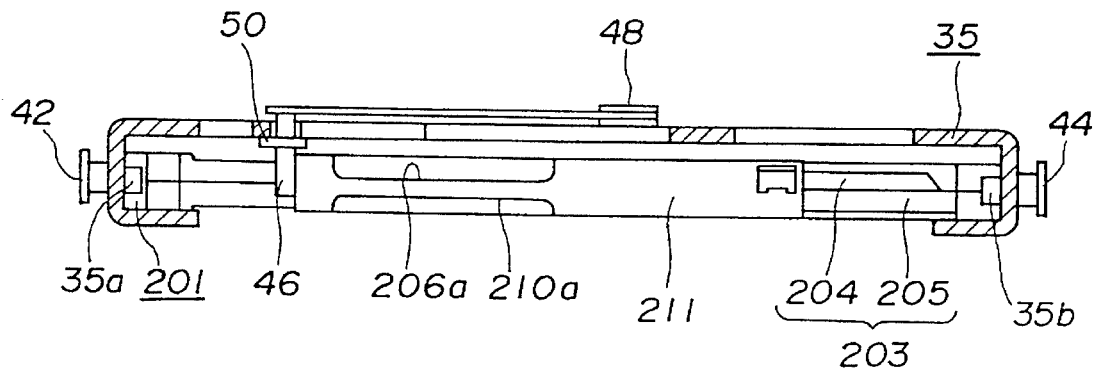
FIG. 21 is a longitudinal cross-sectional view showing the state of engagement of an ejection plate holding lever rotating pin with respect to the optical disc shown in FIG. 17.

In this state, the optical disc cartridge 201 is introduced into the cartridge holder 35 from the front side, with the side of the shutter member 211 first. At this time, as shown in FIGS. 19 and 21, the mistaken insertion inhibiting member 35a is introduced in a space between the guide flanges 201c, 201d on one lateral side of the cartridge main body 203, while the other mistaken insertion inhibiting member 35b is introduced in a space between the guide flanges 201c, 201d on the other side of the cartridge main body 203.

On insertion of the optical disc cartridge 201 into the inside of the cartridge holder 35, the leading side corner of the cartridge main body 203 is contacted with the mistaken insertion inhibiting pin 77 rotatably mounted on the cartridge holder 35. If the optical disc cartridge 201 is inserted in the correct direction, the mistaken insertion inhibiting pin 7 is rotated outward by the optical disc cartridge 201 as shown by an arrow M in FIG. 17 to permit insertion of the optical disc cartridge 201. On the contrary, if the optical disc cartridge 201 is inserted in the incorrect direction into the cartridge holder 35, such insertion is inhibited by the mistaken insertion inhibiting pin 77.

As the disc cartridge 201 is inserted further, the shutter opening pin 46 is abutted on the front side 209 of the cartridge main body 203. At this time, the optical disc cartridge 201 is thrust down towards the disc table 11, by the cartridge thrusting member 89 provided facing the shutter opening pin 46 on the upper plate section 45 of the cartridge holder 35, as shown in FIG. 21, so that the shutter opening pin is abutted against the front side 209 in a manner free from the risk of riding on the pin escape inhibiting member 50 provided on the shutter opening pin 46.

Figure 22:
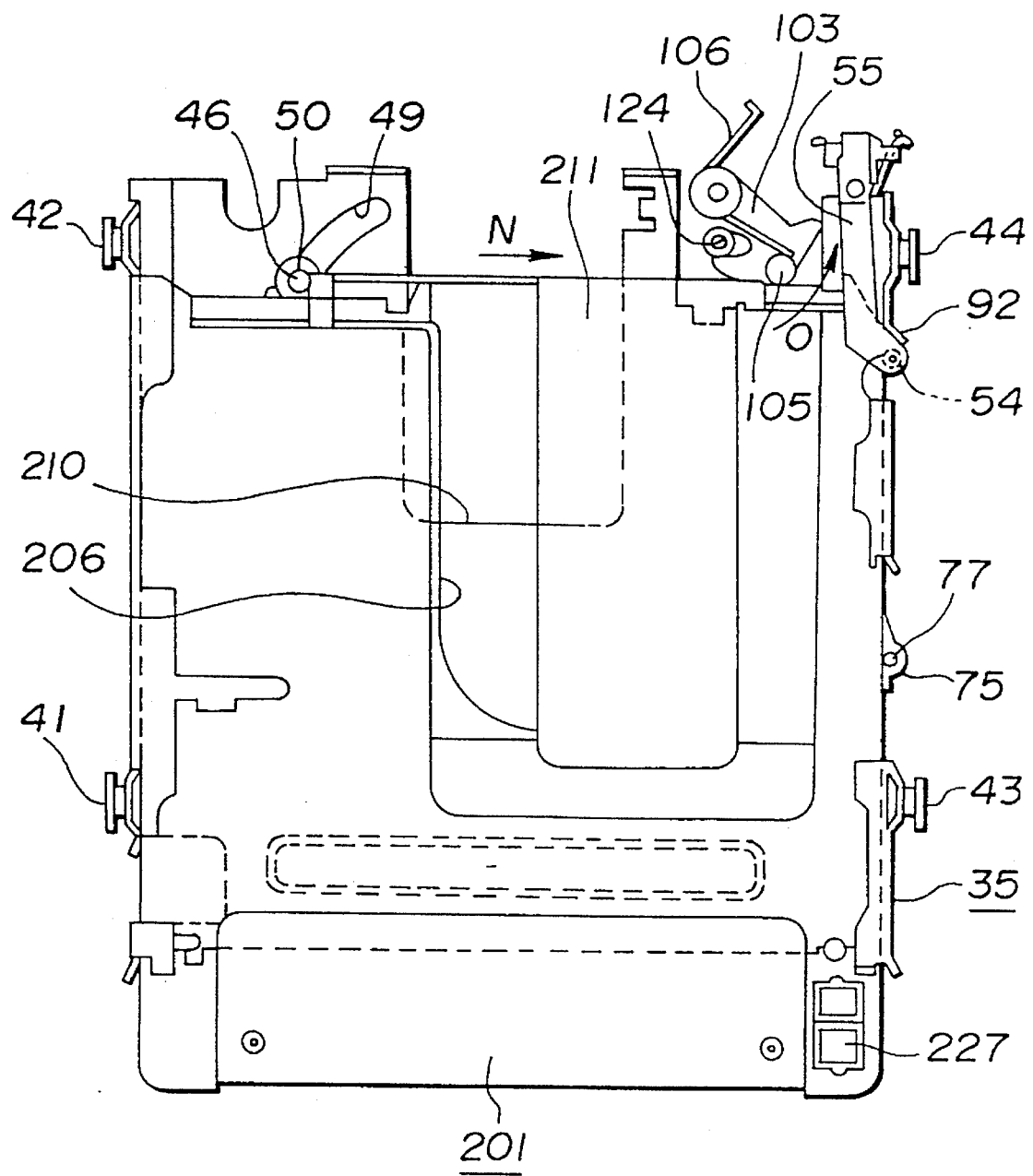
FIG. 22 is a plan view showing the state of opening of a shutter member by the shutter opening pin of the optical disc cartridge shown in FIG. 17.
Figure 23:
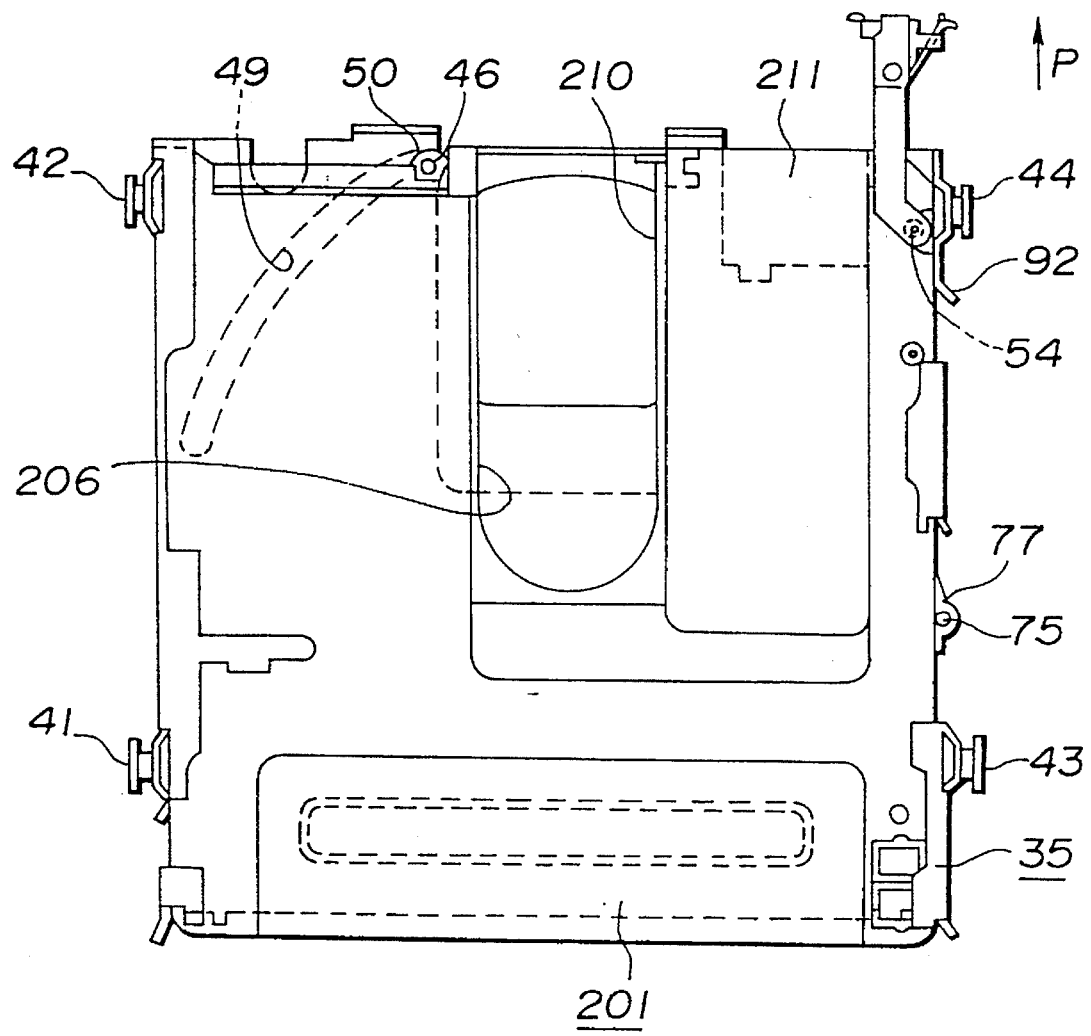
FIG. 23 is a plan view showing the entrained state of the disc cartridge.
Figure 24:
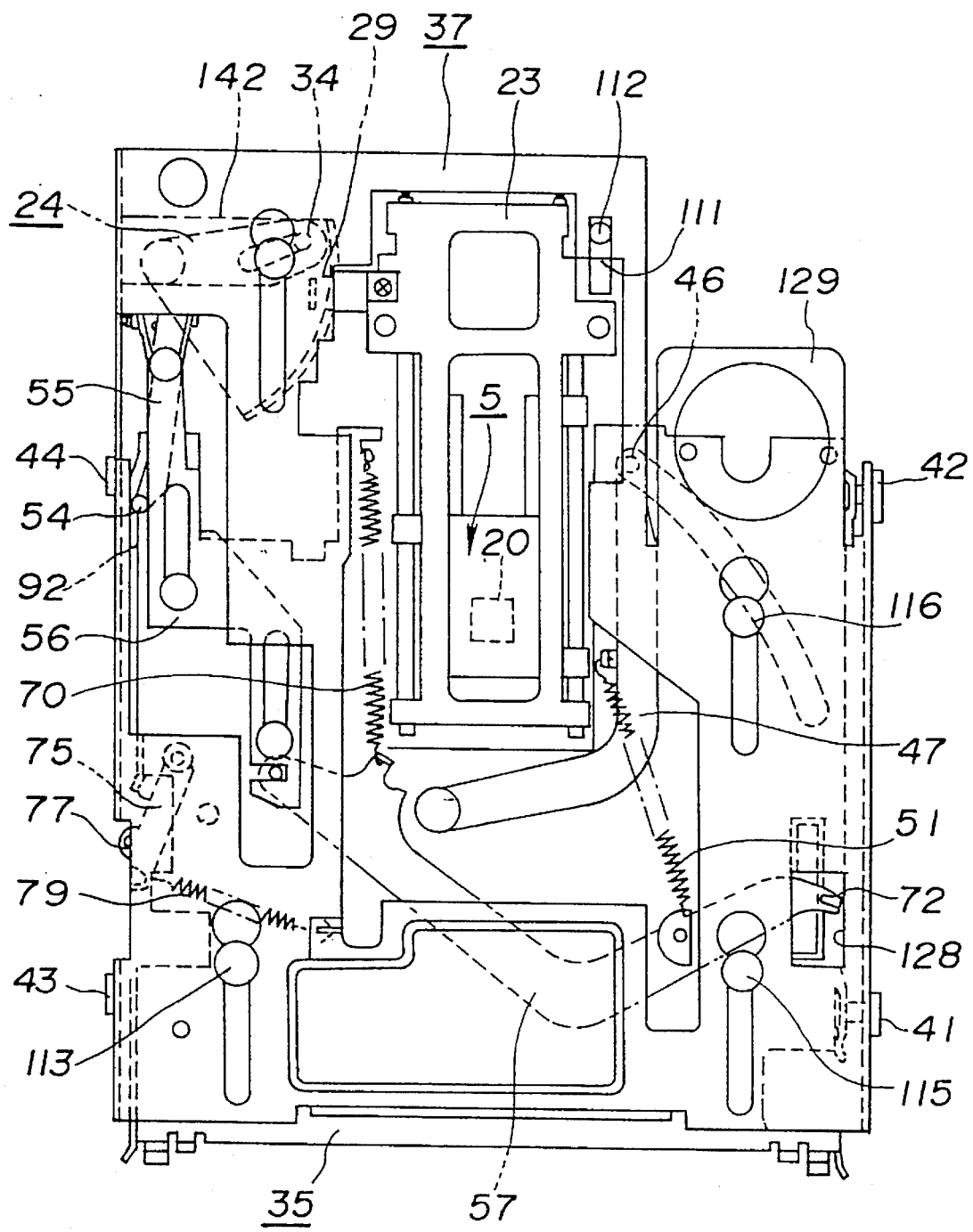
FIG. 24 is a plan view showing the loading state of the disc recording and/or reproducing apparatus shown in FIG. 3.

When the optical disc cartridge 201 is intruded further into the inside of the cartridge holder 35, an end of the shutter member 211 is abutted against the shutter opening pin 211, as shown in FIG. 22, so that the shutter member 211 is moved in a direction of opening the apertures 206, 210 of the optical disc cartridge 201, in a direction indicated by an arrow N in FIG. 22, against the bias of the torsion coil spring provided within the cartridge main body 203. Since the shutter opening pin 46 is position-regulated by the pin escape inhibiting member 50 with respect to the shutter opening pin guide slit 49, the shutter member 211 is shifted to the opening position without the shutter opening pin riding on the shutter member 211.

When the optical disc cartridge 201 is intruded further into the inside of the cartridge holder 35, the rotating pin 105 of the holding lever 103 rotatably mounted on the holder supporting plate 36 is abutted against the foremost part of the optical disc cartridge 201 for rotating the holding lever 103 in a direction shown by an arrow O in FIG. 22 for disengaging the holding lever 103 from the ejection plate retention member 124 provided on the ejection plate 37, as a result of which the ejection plate 37 is unlocked and is moved towards the optical disc cartridge loading/unloading opening under the bias of the fourth tension coil spring 139 provided between the ejection plate 37 and the chassis base plate 6.

Simultaneously, the lateral side 128a of the aperture 128 disengages the operating lever 57 from the engaging lug 72. In this manner, the entraining pin 54, maintained at a position outside of the disc cartridge 201, is engaged in the notch 228 provided in the optical disc cartridge 201. The operating lever 57 is rotated by the second tension coil spring 70 provided between the operating lever 57 and the cartridge holder 35 so that the entraining lever 56 connected to the operating lever 57 is moved towards the optical disc cartridge inserting side. The result is that the entraining member 55 causes the optical disc cartridge 201 to be moved along the optical disc cartridge inserting direction indicated by arrow P in FIG. 23 by the second tension coil spring 70 provided between the operating lever 57 and the cartridge holder 35. Thus the optical disc cartridge 201 is positioned at an inner end of the cartridge holder 35 for fully opening the first and second apertures 206, 210 provided in the optical disc cartridge 201.

Meanwhile, in the present disc recording and/or reproducing apparatus, a mistaken operation of introducing the magnetic disc cartridge 301 into the cartridge holder 35 is similarly inhibited. The reason is that the magnetic disc cartridge 301 can not be introduced by the mistaken insertion inhibiting members 35a, 35b provided at the cartridge inserting slit as the cartridge entrance opening, although the optical disc cartridge 201 may be introduced via the cartridge inserting slit. That is, since the cartridge inserting slit is divided at both lateral sides provided with the mistaken insertion inhibiting members 35a, 35b into two slit sections each 1.5 mm in width, the cartridge main body 303 having a thickness of 3 mm can not be introduced through any of these slit sections. On the other hand, since the distance between the mistake insertion inhibiting members 35a and 35b along the width of the cartridge inserting slit is 89 mm, as mentioned above, the magnetic disc cartridge 301 which is 90 mm in width can not be introduced thereat. The result is that the magnetic disc cartridge 301 can not be inserted via cartridge inserting slit into the inside of the cartridge holder 35.

With shifting of the ejection plate 37, the cartridge holder 35 is caused to descend along the axis of the spindle shaft 10 of the disc rotating and driving unit 2, by the vertical guide pins 41, 42; 43, 44 being guided by the vertical slide slits 135, 136; 137, 138 provided in the ejection plate 37. That is, as the vertical guide pins 41, 42; 43, 44 are guided along the vertical slide slits 135, 136; 137, 138 until being engaged in the acutely downwardly sloped portions 135c, 136c; 137c, 138c of the vertical slide slots 135, 136; 137, 138, the cartridge holder 35 is caused to descend along the vertical guide slits 95, 96; 97, 98 provided in the holder supporting plate 36. At this time, the optical disc cartridge 201 is loaded in position on the cartridge loading section 1. The optical disc cartridge 201 is position-control led by positioning pins 7, 8 and the height setting pins 7a, 8a provided on the chassis base plate 6, while being maintained at a predetermined height. Simultaneously, the optical disc 202 housed within the disc cartridge 201 is set and loaded on the disc table 11.

Figure 25:
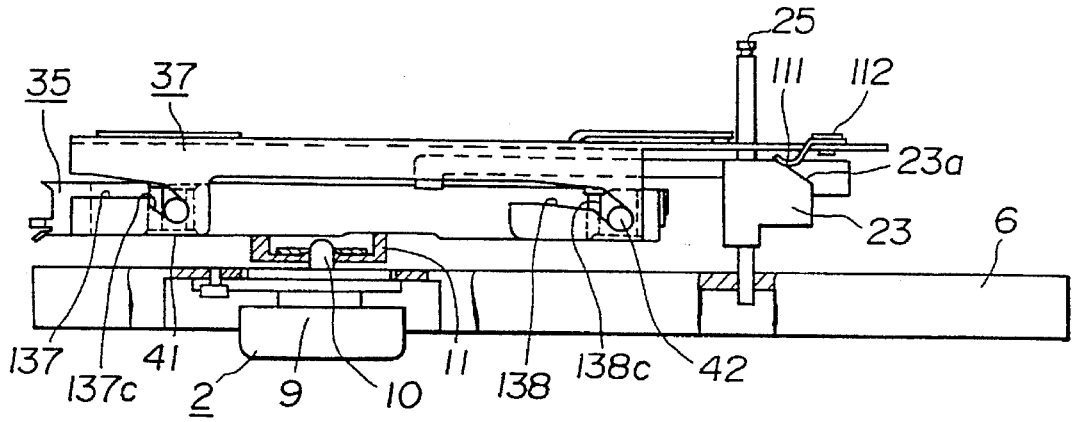
FIG. 25 is a right side view of the disc recording and/or reproducing apparatus shown in FIG. 3.
Figure 26:
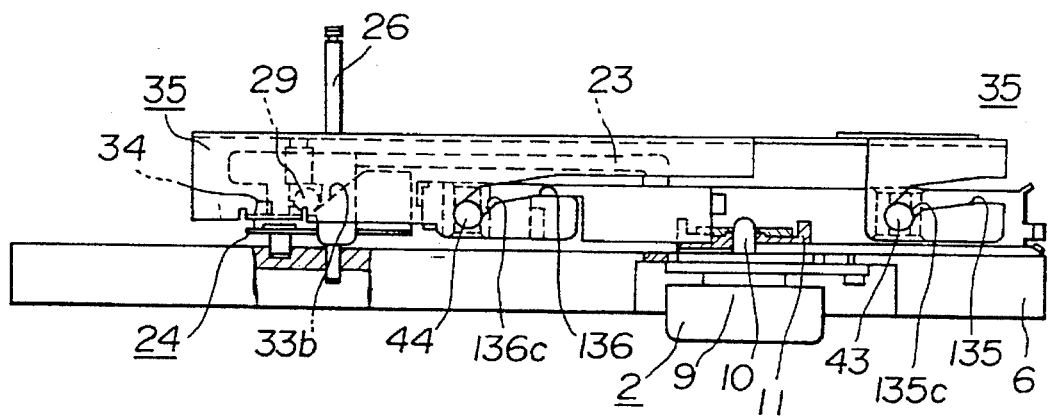
FIG. 26 is a left side view of the disc recording and/or reproducing apparatus shown in FIG. 3.
Figure 27:
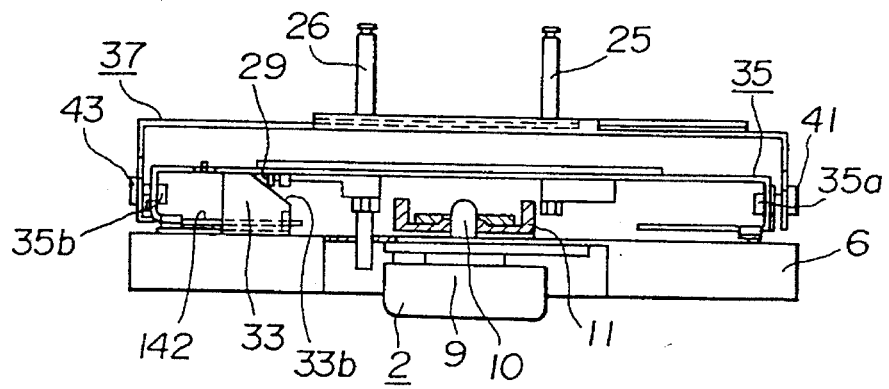
FIG. 27 is a front view of the disc recording and/or reproducing apparatus shown in FIG. 3.

With shifting of the ejection plate 37, the lever operating member 142 provided on the ejection plate 37 is engaged with the magnetic head lifting lever 24 for rotating the lever 24 so that the magnetic head lifting member 23 is caused to descend along the axis of the spindle shaft 10 of the disc rotating driving unit 2, as indicated in FIGS. 25 and 26. When the magnetic head lifting member 23 is caused to descend in this manner, the plate spring 112 provided on the ejection plate 37 is engaged with the engaging surface 23a of the magnetic head lifting member 23, for thrusting the magnetic head lifting member 23, as a result of which the magnetic head 20 movably supported by the magnetic head lifting member 23 faces the aperture 210 of the optical disc cartridge 201. Thus the magnetic head 20 is positioned at a predetermined height relative to the signal recording layer of the optical disc 202 housed within the disc cartridge 201 while being caused to face the optical pickup device 4 to enable recording and reproduction of information signals.

Meanwhile, with the above described disc recording and/or reproducing apparatus, since the magnetic head lifting member 23 is thrust by the plate spring 111 provided on the ejection plate 37 only when the information signals are recorded or reproduced on or from the optical disc 202, the magnetic head 20 may be maintained at a predetermined height relative to the optical disc 202 not only when the optical disc 202 is at a horizontal position relative to the horizontal but when the optical head 202 is at a vertical position relative thereto during recording and reproduction.

Figure 28:
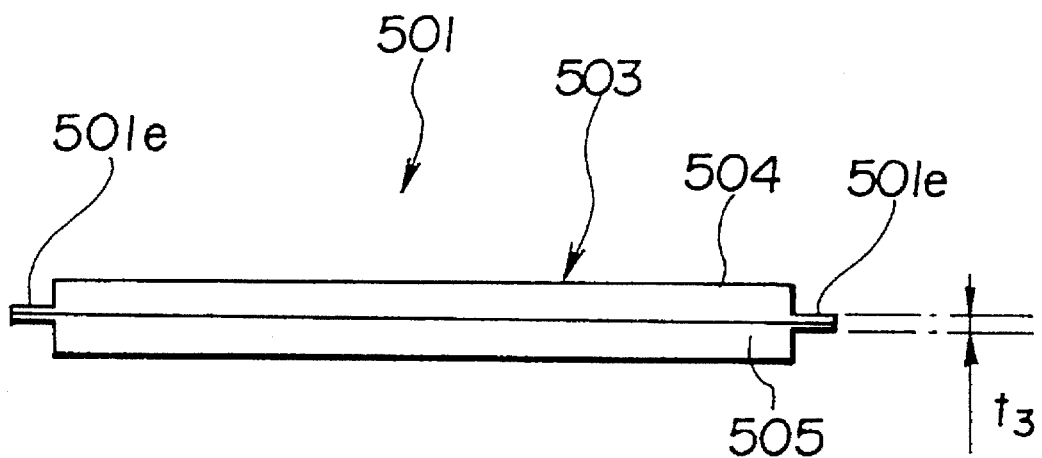
FIG. 28 is a front view showing a modified embodiment of the optical disc cartridge.

It is to be noted that the disc recording and/or reproducing apparatus according to the present invention is not limited to the above described embodiments. For example, it may be used with an optical disc cartridge 501 comprised of a cartridge main body 503 provided with guide flanges 501e, 501e at both lateral sides, as shown in FIG. 28. Similarly to the guide flanges in the preceding embodiments, these guide flanges 501e, 501e are each of a thickness of 1 mm as indicated by arrow t3 in FIG. 28. These guide flanges 501e, 501e are provided at a substantially mid height of the cartridge main body 503 for extending along the lateral sides of the cartridge main body 503 in the inserting direction of the optical disc cartridge. The width of the optical disc cartridge 501, inclusive of the guide flanges 501e, 501e, is selected to be 90 mm.

Figure 29:
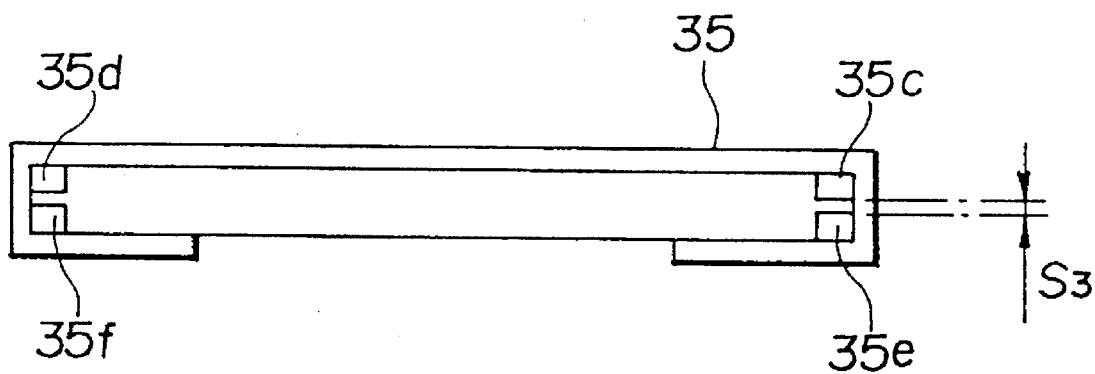
FIG. 29 is a front view showing a modified embodiment of a cartridge holder of the disc recording and/or reproducing apparatus.

In the disc recording and/or reproducing apparatus, used with this optical disc cartridge, mistaken insertion inhibiting members 35c, 35d, 35e, 35f are provided at lateral side corners within the cartridge holder 35, as indicated in FIG. 29. These inhibiting members 35c to 35f are arranged similarly to the mistaken insertion inhibiting members in the preceding embodiments. The width of each of the mistaken insertion inhibiting members 35c to 35f along the width of the cartridge inserting slit is 2.5 mm, so that, at the lateral sides of the cartridge holder 35 provided with these mistaken insertion inhibiting members 35c to 35f, the width S3 of the cartridge inserting slit is equal to the distance between the mistaken insertion inhibiting members 35c and 35e at one lateral side and the distance between the mistaken insertion inhibiting members 35d and 35f at the other lateral side, that is, equal to 1.5 mm. The distance between the mistaken insertion inhibiting members 35c and 35e on the one lateral side and the distance between the mistaken insertion inhibiting members 35d and 35f at the other lateral side is equal to the width of the magnetic disc cartridge 201 which is equal to 90 mm less the widths of the mistaken insertion inhibiting members 35c, 35e, 35d and 35f.

Thus it is possible with the cartridge holder 35 provided with the mistaken insertion inhibiting members 35c, 35e, 35d and 35f to prevent the magnetic disc cartridge 301 which is 3 mm in thickness and 90 mm in width from being introduced inadvertently into the cartridge holder.

Figure 30:
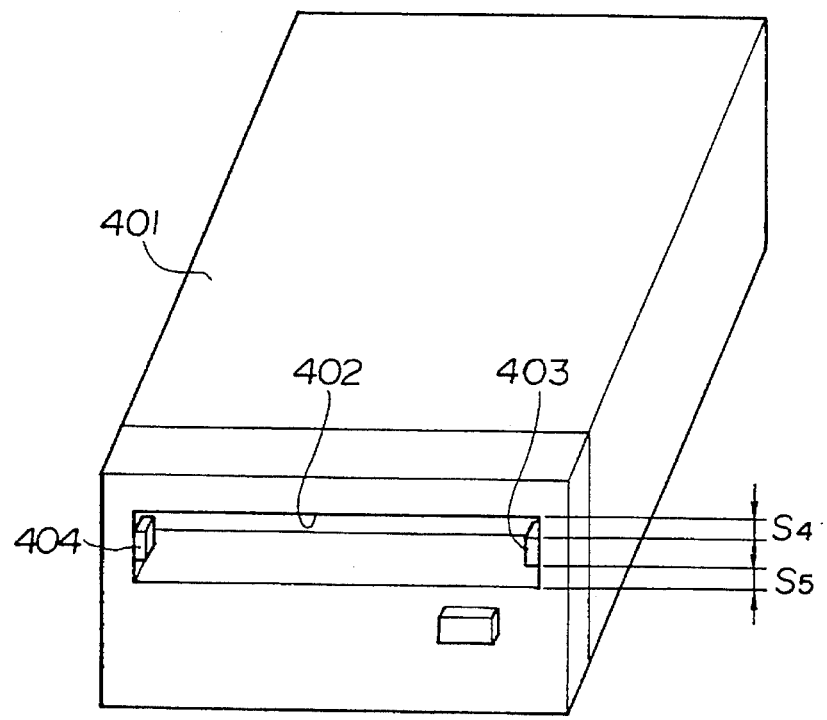
FIG. 30 is a perspective view of a disc recording and/or reproducing apparatus enclosed in an outer casing.
Figure 31:
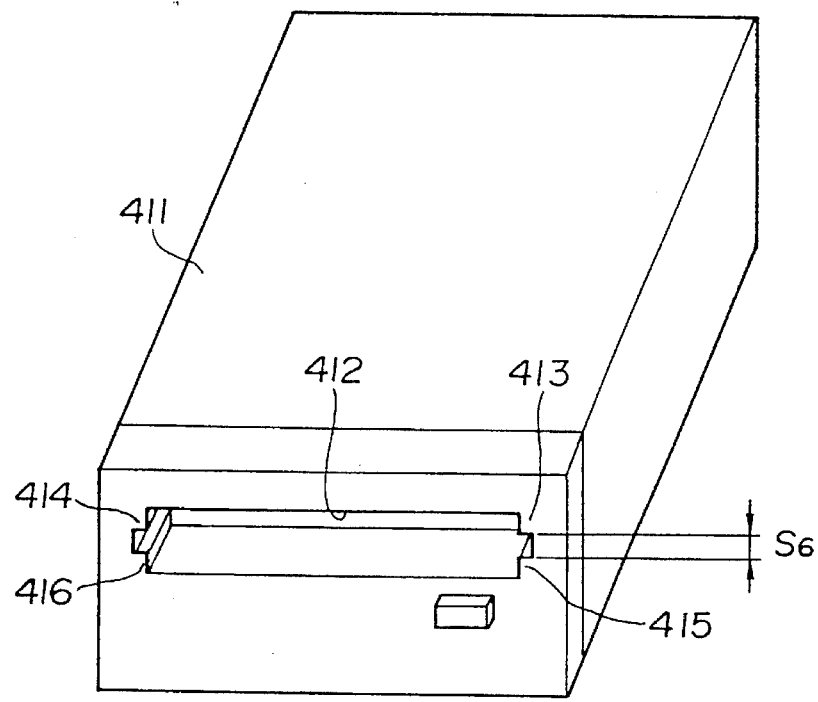
FIG. 31 is a perspective view showing a modified embodiment of the disc recording and/or reproducing apparatus enclosed in an outer casing.

The mistaken insertion inhibiting members may also be formed on inner lateral sides of a slit-shaped opening in an outer casing of the disc recording and/or reproducing apparatus in register with the inlet of the cartridge holder at an initial position, as shown in FIGS. 30 or 31, instead of within the cartridge holder 35, as in the preceding embodiments.

Referring to FIG. 30, the outer casing employed in the disc recording and/or reproducing apparatus is adapted to permit insertion only of an optical disc cartridge in which insertion guide flanges 201c, 201d; 201c, 201d are formed as one on lateral sides 207, 208 of the cartridge main body 203.

That is, mistaken insertion inhibiting members 403, 404 are provided on both sides of a slit-shaped opening 402 of the outer casing 401 which is provided in register with the inlet in the cartridge holder 35 in the initial position. These mistaken insertion inhibiting members 403, 404 are in the form of projections provided at mid positions along the width of both lateral wall sections of the slit-shaped opening 402. Each of the mistaken insertion inhibiting members 403, 404 is 3.5 mm in width and 0.5 mm in height. Thus the slit-shaped opening 402 of the outer casing 401 is divided at both lateral sides provided with the mistaken insertion inhibiting members 403, 404 into two slit sections, each 1.5 mm height, as indicated by arrows S4 and S5 in FIG. 30. These slit sections, indicated by arrows S4 and S5 in FIG. 30, are narrower than the cartridge main body 203 which is 3 mm in thickness. The width of the slit-shaped opening 402 is equal to the distance between the mistaken insertion inhibiting members 403, 404 at the mid part or equal to 89 mm. Thus the slit-shaped opening is narrower in width than the cartridge main body 203 which is 90 mm in width.

Thus, with the present disc recording and/or reproducing apparatus, if it is tried to perform a mistaken operation of inserting the magnetic disc cartridge 301 into the cartridge holder 35, such operation is inhibited. That is, since the slit-shaped opening 402 is divided into two slit sections, each 1.5 mm in width, at the lateral sides provided with the mistaken insertion inhibiting members 403, 404, the cartridge main body 303, which is 3 mm in thickness, can not be introduced into any of these slit sections. On the other hand, the cartridge main body 303 can not be inserted along its width, because the distance between the mistaken insertion inhibiting members 403, 404 is narrower than the width of the cartridge main body 303 which is 90 mm. Thus the magnetic disc cartridge 301 can not be inserted into the cartridge holder 35 by means of the slit-shaped opening 402.

The outer casing, employed in the disc recording and/or reproducing apparatus, may be so designed as shown in FIG. 31 that only an optical disc cartridge having a cartridge main body 203 provided with guide flanges 201e, 201e on both lateral sides, as shown in FIG. 28.

On both lateral sides of a slit-shaped opening 412 of the outer casing 411, provided in register with an entrance of the cartridge holder 35 in its initial position, mistaken insertion inhibiting projections 413, 414, 415 and 416 are provided in a manner substantially similar to the mistaken insertion inhibiting members in the preceding embodiments. These projections are each of a width along the width of the slit-shaped opening 412 equal to 2.5 mm. Thus, by the provision of these mistaken insertion inhibiting projections 413, 414, 415 and 416, the width S6 of the slit-shaped opening 412 at the lateral sides thereof is equal to the distance between the projections 413 and 415 and between the projections 414 and 416, which distance is equal to 1.5 mm. On the other hand, the distance between the projections 413, 415 and the projections 414, 416 is narrower than the width of the magnetic disc cartridge 201, which is equal to 90 mm, by a distance equal to the height of the projections 413 to 416.

Thus, with the slit-shaped opening 412 of the outer casing 411, provided with the mistaken insertion inhibiting projections 413, 415, 414 and 416, it is similarly possible to prevent mistaken insertion of the cartridge main body 303 having a thickness of 3 mm.

What is claimed is:

1. A disc recording or reproducing apparatus which incorporates means for allowing only the loading into the disc recording or reproducing apparatus of an optical disc cartridge having a cartridge main body housing an optical disc therein, the cartridge main body including at least a guide section on at least one lateral side edge thereof parallel to a direction of insertion of the optical disc cartridge into the disc recording or reproducing apparatus, and preventing the loading into the disc recording or playback apparatus of a magnetic disc cartridge housing a magnetic disc of the same radius as the optical disc therein and having a cartridge thickness lesser than the thickness of the optical disc cartridge and no guide section on a lateral side edge of the magnetic disc cartridge, comprising loading means having a cartridge insertion opening for loading the optical disc cartridge onto a disc loading section, and mistaken insertion inhibiting means having one or more protuberances for restricting a dimension of the cartridge insertion opening to be smaller than a corresponding dimension of the magnetic disc cartridge so as to block insertion of the magnetic disc cartridge into the cartridge insertion opening but for mating with the guide section of the optical disc cartridge so as not to prevent insertion of the optical disc cartridge into the cartridge insertion opening.

2. A disc recording or reproducing apparatus as claimed in claim 1 wherein the loading means include a cartridge holder and lifting means for raising and lowering the cartridge holder relative to the disc loading section, and wherein the mistaken insertion inhibiting means is provided on the cartridge holder.

3. A disc recording or reproducing apparatus as claimed in claim 2 wherein the mistaken insertion inhibiting means is provided within the cartridge holder at such a position that both the distance between an inner surface of the cartridge holder and the mistaken insertion inhibiting means and the distance between the mistaken insertion inhibiting means and another inner surface of the cartridge holder are each smaller than the thickness of the magnetic disc cartridge.

* * * * *